US011926152B2

(12) United States Patent
Maruyama et al.

(10) Patent No.: US 11,926,152 B2
(45) Date of Patent: Mar. 12, 2024

(54) PRINTING APPARATUS AND CARRIAGE APPARATUS

(71) Applicant: CANON KABUSHIKI KAISHA, Tokyo (JP)

(72) Inventors: Ryohei Maruyama, Kanagawa (JP); Daigo Kuronuma, Kanagawa (JP); Masakazu Nagashima, Kanagawa (JP); Tomohito Abe, Kanagawa (JP); Kenta Iimura, Kanagawa (JP); Hiromasa Yoneyama, Kanagawa (JP); Naoaki Wada, Kanagawa (JP); Kichinosuke Hirokawa, Tokyo (JP); Akira Fujikake, Kanagawa (JP); Toshiaki Yamaguchi, Tokyo (JP); Hideyuki Nozawa, Tochigi (JP)

(73) Assignee: Canon Kabushiki Kaisha, Tokyo (JP)

( * ) Notice: Subject to any disclaimer, the term of this patent is extended or adjusted under 35 U.S.C. 154(b) by 7 days.

(21) Appl. No.: 17/742,524

(22) Filed: May 12, 2022

(65) Prior Publication Data

US 2022/0363078 A1 Nov. 17, 2022

(30) Foreign Application Priority Data

May 14, 2021 (JP) ................................ 2021-082602

(51) Int. Cl.
*B41J 19/20* (2006.01)
*B41J 29/38* (2006.01)

(52) U.S. Cl.
CPC ............ *B41J 19/202* (2013.01); *B41J 29/38* (2013.01)

(58) Field of Classification Search
CPC ...... B41J 19/202; B41J 19/005; B41J 29/393; B41J 29/38
See application file for complete search history.

(56) References Cited

U.S. PATENT DOCUMENTS 4,203,679 A * 5/1980 Duerr .................... B41J 19/202 400/322
2003/0206212 A1* 11/2003 Mitarai ................. B41J 19/202 347/37

(Continued)

FOREIGN PATENT DOCUMENTS

| | | | |
|---|---|---|---|
| EP | 0133650 | A1 * | 3/1985 |
| JP | 3604994 | B2 | 12/2004 |
| JP | 2014-151534 | A | 8/2014 |

OTHER PUBLICATIONS

Tomohito Abe, Kenta Imura, Kichinosuke Hirokawa, Akira Fujikake, Toshiaki Yamaguchi, Daigo Kuronuma, Masakazu Nagashima, Naoaki Wada, Ryohei Maruyama, Hideyuki Nozawa, Hiromasa Yoneyama, U.S. Appl. No. 17/742,534, filed May 12, 2022.

(Continued)

*Primary Examiner* — Julian D Huffman
(74) *Attorney, Agent, or Firm* — Venable LLP

(57) ABSTRACT

A printing apparatus includes a carriage mounted with a printing unit; a first motor configured to move the carriage in a predetermined direction; a second motor configured to move the carriage in the predetermined direction; and a control unit. The control unit executes a first mode in which, when causing the printing unit to perform printing under a first printing condition, the first motor is driven in a first direction and the second motor is driven in the first direction, and a second mode in which, when causing the printing unit to perform printing under a second printing condition different from the first printing condition, the first motor is driven in the first direction and the second motor is driven in the first direction while changing an output ratio between the first motor and the second motor.

20 Claims, 15 Drawing Sheets

(56) References Cited

U.S. PATENT DOCUMENTS

| | | | | |
|---|---|---|---|---|
| 2013/0127944 | A1* | 5/2013 | Urban | B41J 2/0057<br>347/17 |
| 2014/0139848 | A1* | 5/2014 | Kanzawa | B41J 19/202<br>358/1.5 |
| 2022/0097427 | A1* | 3/2022 | Abe | B41J 29/38 |
| 2022/0097429 | A1 | 3/2022 | Takahashi et al. | |
| 2022/0363078 | A1* | 11/2022 | Maruyama | B41J 29/38 |

OTHER PUBLICATIONS

Tomohito Abe, Kenta Imura, Kichinosuke Hirokawa, Akira Fujikake, Toshiaki Yamaguchi, Daigo Kuronuma, Masakazu Nagashima, Naoaki Wada, Ryohei Maruyama, Hideyuki Nozawa, Hiromasa Yoneyama, U.S. Appl. No. 17/742,545, filed May 12, 2022.

* cited by examiner

| PRINT MODE | FAST | NORMAL | BEAUTIFUL |
|---|---|---|---|
| CONTROL MODE (OUTPUT RATIO) | 1 : 1 | 2 : 1 | 1 : 0 |

| PAPER TYPE | PLAIN PAPER | COATED PAPER | GLOSSY PAPER |
|---|---|---|---|
| CONTROL MODE (OUTPUT RATIO) | 1 : 1 | 2 : 1 | 1 : 0 |

| | FAST | NORMAL | BEAUTIFUL |
|---|---|---|---|
| PLAIN PAPER | V1 | V2 | V3 |
| COATED PAPER | V2 | V3 | V4 |
| GLOSSY PAPER | V3 | V4 | V5 |

PRINTING APPARATUS AND CARRIAGE APPARATUS

BACKGROUND OF THE INVENTION

Field of the Invention

The present invention relates to a printing apparatus.

Description of the Related Art

There is known a printing apparatus that performs printing on a print medium such as paper by discharging ink from a printhead while moving a carriage mounted with the printhead. With such a printing apparatus, demands for improving the productivity and the image quality of printing are increasing in recent years. Therefore, while the weight of the printhead increases due to the tendency of the printhead to become longer and have a higher density, the carriage is demanded to move with a high velocity and improve the positional accuracy.

As a driving method of the carriage, a method is known in which the carriage is connected to an endless belt (timing belt) and the carriage is moved by causing the belt to travel by a driving force of a motor. It is conceivable to employ a large high-output motor to increase the moving velocity of the carriage, but the market distribution scale of the large high-output motor is small and the cost thereof is high. Japanese Patent No. 3604994 discloses an apparatus in which one of two pulleys for causing the endless belt to travel is rotated by a stepper motor and the other one is rotated by a DC motor.

In a method in which a plurality of motors are used as driving sources of a mechanism for moving a carriage, the carriage can be moved at a higher velocity and the printing efficiency can be improved. On the other hand, the vibration characteristics (velocity fluctuation and the like) in the method in which the plurality of motors are used may be different from those in a method in which one motor is used. The vibration characteristics of the carriage can be a factor of a decrease in printing accuracy.

SUMMARY OF THE INVENTION

The present invention provides a technique that enables printing operations having different degrees of priority of the printing efficiency and the printing accuracy.

According to an aspect of the present invention, there is provided a printing apparatus comprising a carriage mounted with a printing unit configured to perform printing on a print medium; a first motor configured to rotate in a first direction to move the carriage in a predetermined direction; a second motor configured to rotate in the first direction to move the carriage in the predetermined direction; and a control unit configured to control the first motor and the second motor, wherein the control unit executes a first mode in which, when causing the printing unit to perform printing under a first printing condition, the first motor is driven in the first direction and the second motor is driven in the first direction, and a second mode in which, when causing the printing unit to perform printing under a second printing condition different from the first printing condition, the first motor is driven in the first direction and the second motor is driven in the first direction while changing an output ratio between the first motor and the second motor.

Further features of the present invention will become apparent from the following description of exemplary embodiments (with reference to the attached drawings).

DESCRIPTION OF THE EMBODIMENTS

Figure 1:
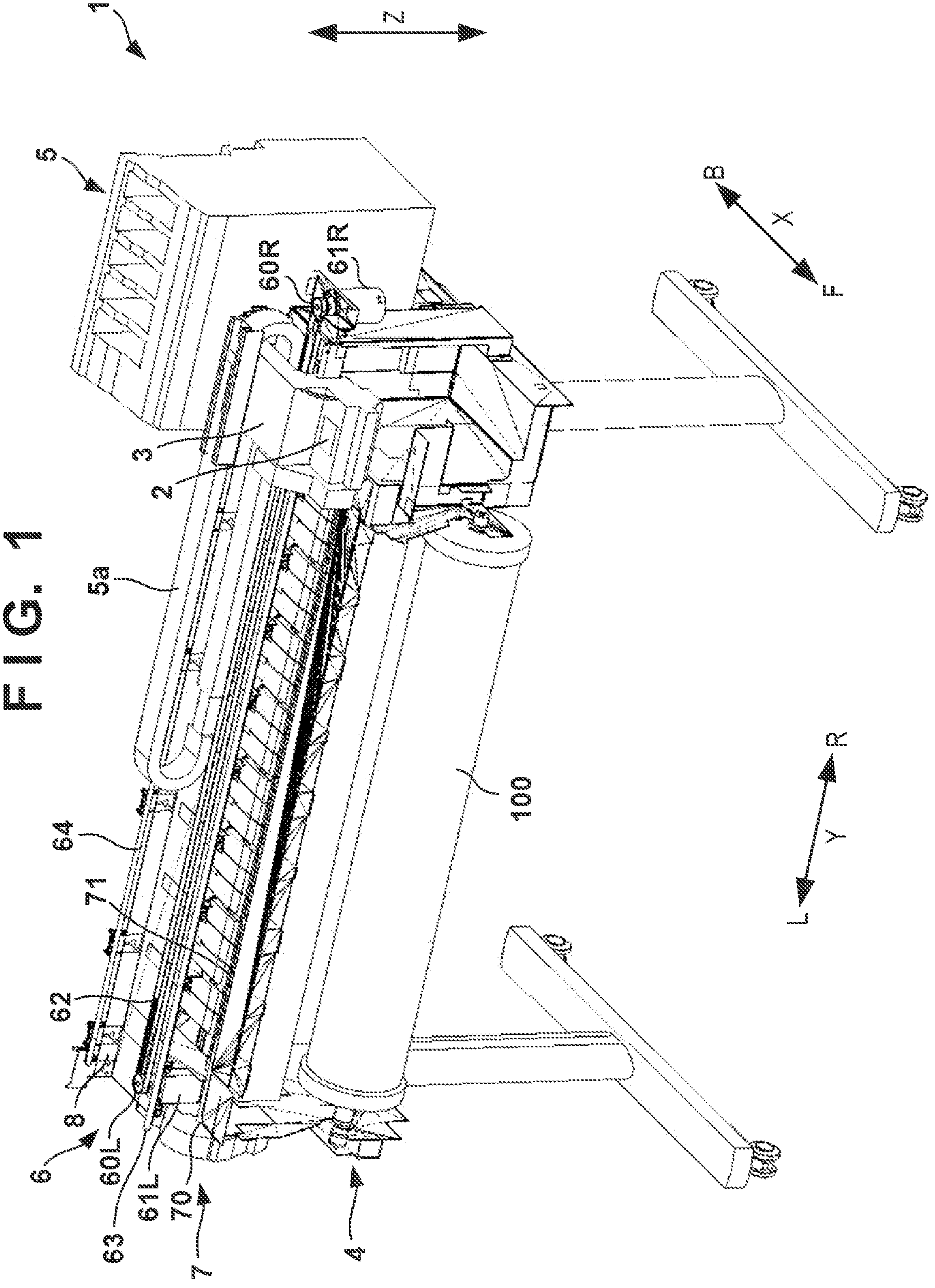
FIG. 1 is a perspective view of a printing apparatus according to an embodiment of the present invention.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

Furthermore, in the attached drawings, the same reference numerals are given to the same or similar configurations, and redundant description thereof is omitted.

First Embodiment

<Outline of Printing Apparatus>

Figure 2:
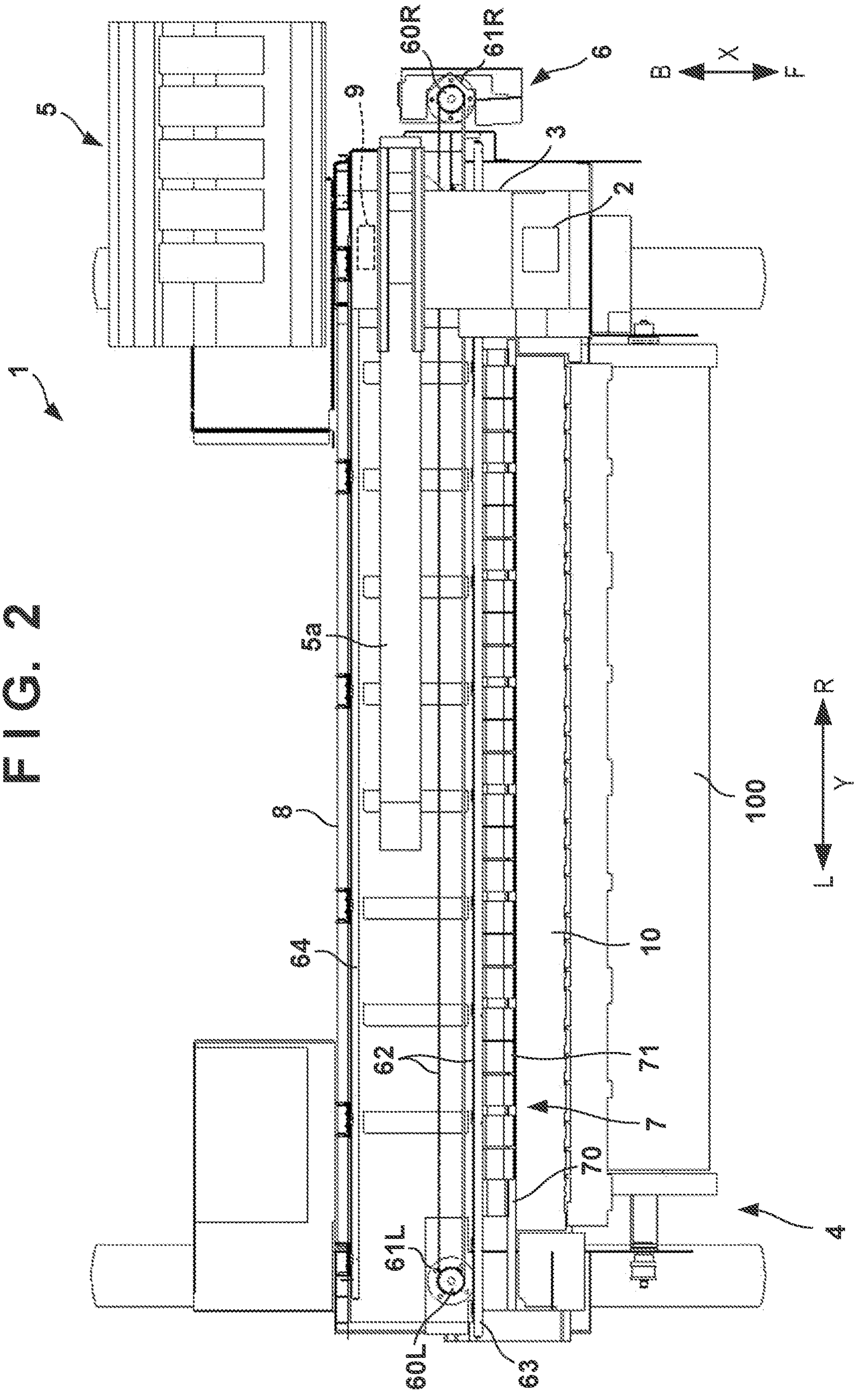
FIG. 2 is a plan view of the printing apparatus shown in FIG. 1.

FIG. 1 is a perspective view of a printing apparatus 1 in this embodiment, and FIG. 2 is a plan view of the printing apparatus 1. In the drawings, an arrow Y indicates the widthwise direction (left-and-right direction) of the printing apparatus 1, L indicates the left side, and R indicates the right side. An arrow X indicates the depth direction (front-and-rear direction) of the printing apparatus 1, F indicates the front side, and B indicates the rear side. An arrow Z indicates the vertical direction. In this embodiment, a case will be described in which the present invention is applied to a serial inkjet printing apparatus that performs printing by discharging ink to a print medium. However, the present invention is also applicable to a printing apparatus of another form.

Note that "printing" includes not only forming significant information such as characters and graphics but also forming images, figures, patterns, and the like on print media in a broad sense, or processing print media, regardless of whether the information formed is significant or insignificant or whether the information formed is visualized so that a human can visually perceive it. In addition, although in this embodiment, sheet-like paper is assumed as a "print medium" serving as a print target, sheet-like cloth, plastic film, and the like may be used as print media.

The printing apparatus 1 includes a feeding unit 4. The feeding unit 4 holds a print media to be fed into the printing apparatus 1. In this embodiment, a roll sheet 100 is used as the print medium. However, the print medium may be a cut sheet. The roll sheet 100 is obtained by winding a sheet into a roll form around a cylindrical core. The roll sheet 100 has, for example, a width of 10 to 60 inches in the X direction.

The printing apparatus 1 includes a conveying unit 7. The conveying unit 7 is a sheet conveying mechanism that includes a conveying roller 70 and a pinch roller 71 pressed against the conveying roller 70. The sheet pulled out from the roll sheet 100 is fed to the rear side in the X direction. Then, the sheet is folded to the front side and reaches the conveying unit 7. The sheet is then nipped between the conveying roller 70 and the pinch roller 71 of the conveying unit 7 and conveyed on a platen 10 to the front side in the X direction.

The printing apparatus 1 includes a printhead 2 that prints an image by discharging ink to the sheet conveyed on the platen 10 by the conveying unit 7. The printhead 2 includes a plurality of nozzles which discharge ink. An energy element that generates energy for discharging ink by supply of power is arranged in each nozzle. The energy element is, for example, an electrothermal transducer such as a heater or a piezoelectric transducer such as a piezoelectric element. The printhead 2 can discharge different kinds of ink (for example, ink of a plurality of colors such as black (K), cyan (C), magenta (M), and yellow (Y)), and multiple nozzles are formed for each kind of ink.

Ink is supplied to the printhead 2 from an ink container 5. The ink container 5 includes a tank for each kind of ink, and ink is stored in the tank. Ink is supplied from the ink container 5 to the printhead 2 via a flexible tube (not shown) supported by a chain link 5*a*.

The printhead 2 is mounted on a carriage 3, and the printing apparatus 1 includes a carriage apparatus described below. The carriage 3 is moved by a driving unit 6 in the Y direction. The driving unit 6 includes guide rails 63 and 64 extended parallel to the Y direction. The carriage 3 engages with the guide rails 63 and 64 so as to be guided in movement in the Y direction. The driving unit 6 includes pulleys 60R and 60L as an example of a plurality of rotation members. The pulleys 60R and 60L are spaced apart from each other in the Y direction and have the same specifications (outer diameter, weight, and the like). A timing belt 62, which is an example of an endless belt, is wound around the pulleys 60R and 60L. The carriage 3 is connected to the timing belt 62.

The driving unit 6 includes carriage motors 61R and 61L. The carriage motor 61R is a driving source for rotating the pulley 60R, and the carriage motor 61L is a driving source for rotating the pulley 60L. In this embodiment, the carriage motor 61R is configured to directly rotate the pulley 60R while the pulley 60R is connected to the output shaft of the carriage motor 61R. However, the carriage motor 61R may be configured to rotate the pulley 60R via a decelerator. Similarly, the carriage motor 61L is configured to directly rotate the pulley 60L while the pulley 60L is connected to the output shaft of the carriage motor 61L. However, the carriage motor 61L may be configured to rotate the pulley 60L via a decelerator. Each of the carriage motors 61R and 61L is, for example, a brushless DC motor and, in this embodiment, the carriage motors 61R and 61L are the same product. Accordingly, the carriage motors 61R and 61L have the same performance and characteristics during driving.

The carriage 3 can be moved by driving one or both of the carriage motors 61R and 61L to cause the timing belt 62 to travel. Further, by switching the rotation directions of the carriage motors 61R and 61L, the carriage 3 can be reciprocated in the Y direction. In this embodiment, it is possible to move the carriage 3 by outputs of two carriage motors 61R and 61L, so that the higher output can be obtained than in a case of driving by one carriage motor. Therefore, even if the carriage 3 is heavy, it can be moved at a higher velocity.

An encoder sensor 9 is mounted on the carriage 3. The encoder sensor 9 reads a linear scale (encoder scale) 8 extended in the Y direction and outputs a signal indicating the Y-direction position of the carriage 3. The linear scale 8 includes, for example, transmissive portions and light shielding portions repeatedly formed at predetermined constant intervals in the Y direction. The encoder sensor 9 is, for example, an optical sensor which includes a light emitting unit and a light receiving unit. The encoder sensor 9 outputs, as a detection signal, a light-receiving result of the light receiving unit which changes depending on whether light is received from the transmissive portion or the light shielding portion.

When the carriage 3 moves in the Y direction, the encoder sensor 9 can obtain a pulsed signal. By counting the number of pulses, the Y-direction position of the carriage 3 can be calculated. Further, the moving velocity of the carriage 3 can be calculated from the number of pulses per unit time. For example, assume that the transmissive portion and the light shielding portion of the linear scale 8 are repeated in 150 cycles per inch. Each time the carriage moves 1/150 inch, the encoder sensor 9 obtains a one-pulse signal. If three pulses are counted in a time of 500 μs, the velocity v of the carriage 3 can be calculated as v=(3/150 inch)/500 μs=40 ips.

In a printing operation, the sheet is intermittently conveyed by the conveying unit 7 (stepped conveyance). While the conveyance of the sheet is stopped, the carriage 3 is moved in the main scanning direction (Y direction) and ink is discharged from the printhead 2 onto the sheet (printing scan). When printing for one scan ends, the conveying unit 7 conveys the sheet by a predetermined amount in the subscannig direction (a direction orthogonal to the main scanning direction). Then, printing scan is performed. By repeating printing scan and stepped conveyance of the sheet, an image is printed on the sheet. The sheet where image printing is completed is cut by a cutter mechanism (not shown).

<Control Apparatus>

Figure 3:
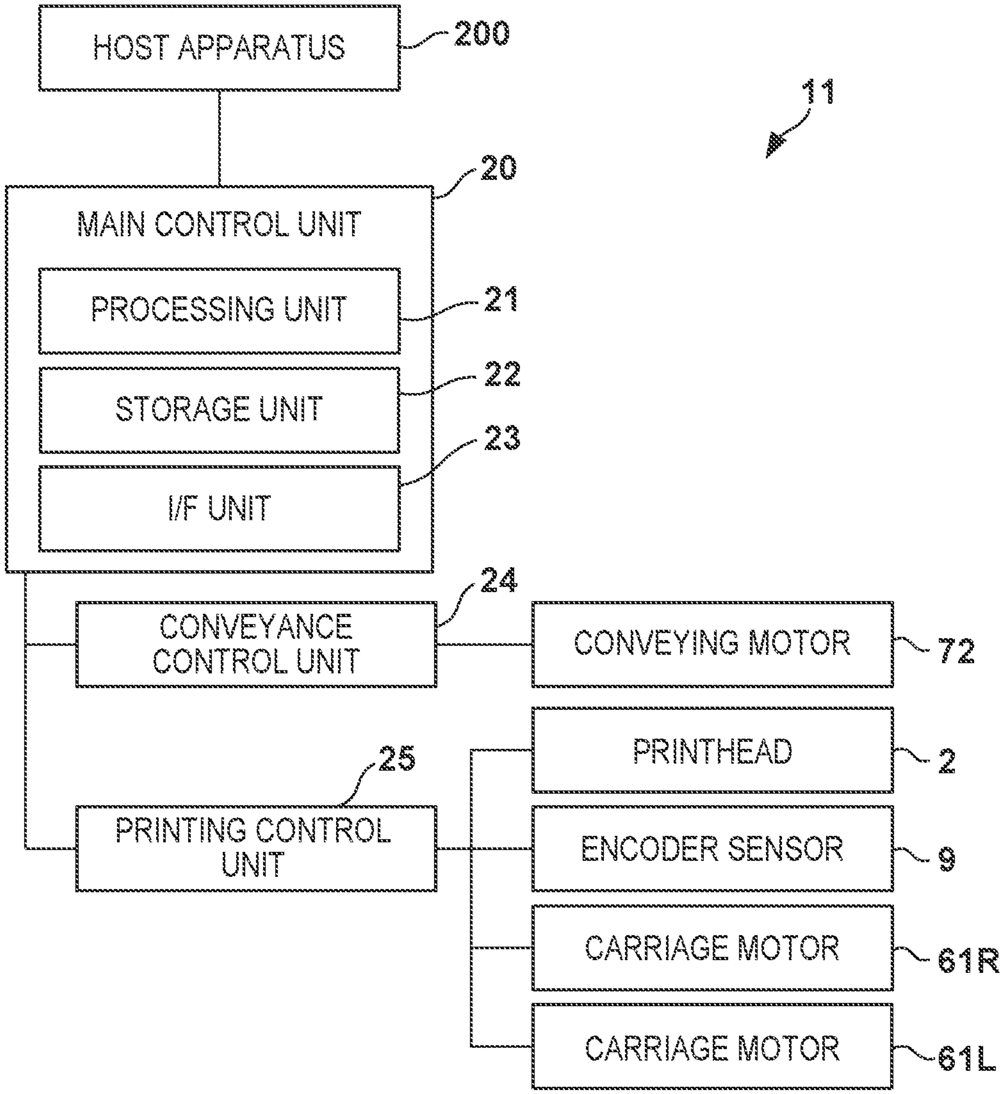
FIG. 3 is a block diagram of a control apparatus of the printing apparatus shown in FIG. 1.

With reference to FIG. 3, a control apparatus 11 of the printing apparatus 1 will be described. The control apparatus 11 is a circuit that includes at least one processor and at least one storage device, and the processor executes a program stored in the storage device. The control apparatus 11 according to this embodiment includes a main control unit 20, a conveyance control unit 24, and a printing control unit 25. The main control unit 20 receives image data and a printing instruction thereof from a host apparatus 200 and performs a printing operation.

The main control unit 20 includes a processing unit 21, a storage unit 22, and an interface unit (I/F unit) 23, and controls the entire printing apparatus 1. The processing unit 21 is a processor represented by a CPU, and executes a program stored in the storage unit 22. The storage unit 22 is a storage device such as a RAM or a ROM, and stores programs and data.

The conveyance control unit 24 and the printing control unit 25 perform conveyance control and printing control, respectively, by following instructions of the main control unit 20. For example, similar to the main control unit 20, each of the control units 24 and 25 includes a processing unit, a storage unit, and an I/F unit. A drive circuit for driving the motor and the like are also included.

The conveyance control unit 24 controls a conveying motor 72 that rotates the conveying roller 70 to perform conveyance control of the sheet. Note that a detection result of the sensor that detects the rotation amount of the conveying motor 72 and a detection result of the sensor that detects the conveyance position of the sheet (both sensors are not shown) are input to the conveyance control unit 24, and the conveyance control unit 24 controls the conveying motor 72 based on these detection results.

The printing control unit 25 performs driving control of the carriage motors 61R and 61L (movement control of the carriage 3) and driving control of the printhead 2 (ink discharge control) based on a detection result of the encoder sensor 9.

<Movement Control of Carriage>

Figure 4A:
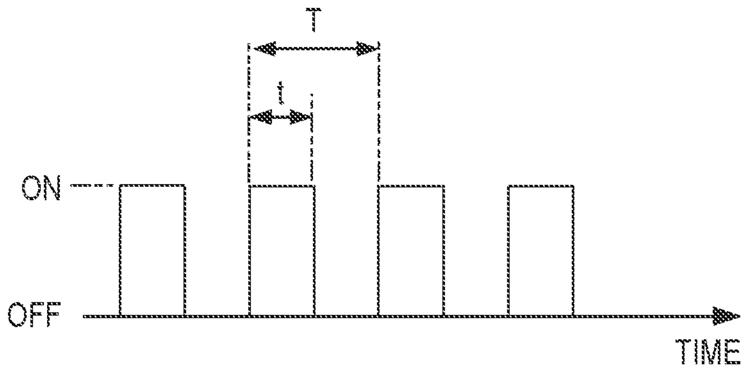
FIG. 4A is a view for explaining PWM control.

The carriage motors 61R and 61L are controlled independently. In this embodiment, driving control of the carriage motors 61R and 61L is PWM (Pulse Width Modulation) control. In PWM control, the output power is controlled by the ratio (duty ratio) of the energization time (ON time) per unit time. FIG. 4A is a view for explaining this. FIG. 4A shows an example in which ON time t per unit time T is ½T, and the duty ratio is 50%. As the duty ratio increases, the power supplied to each of the carriage motors 61R and 61L increases, and the output of each of the carriage motors 61R and 61L increases. The output of each of the carriage motors 61R and 61L is maximum when the duty ratio is 100%. Note that PWM control is employed as driving control of the carriage motors 61R and 61L in this embodiment, but another control method may be employed.

Figure 4B:
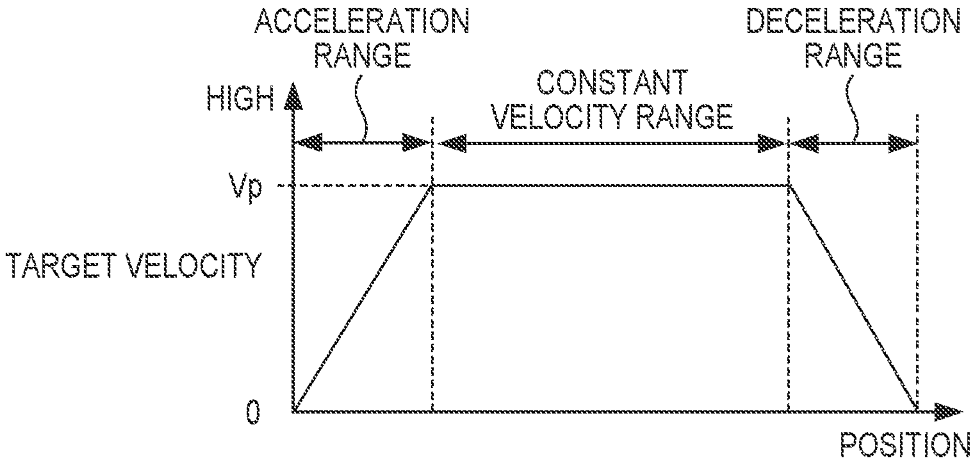
FIG. 4B is a graph showing the target velocity with respect to the position of a carriage.

The movement control of the carriage 3 in this embodiment is feedback control. At each of a large number of Y-direction positions of the carriage 3, a target velocity at the position is set in advance. FIG. 4B shows an example (velocity profile). The ordinate represents the target velocity of the carriage 3, and the abscissa represents the Y-direction position of the carriage 3.

The acceleration start position, the stop target position, and the deceleration start position of the carriage 3 are determined in advance. In this embodiment, the Y-direction positions of the carriage 3 are roughly classified into an acceleration range, a constant velocity range, and a deceleration range. The carriage 3 is accelerated to a printing velocity Vp, performs printing scan during the constant velocity range of the printing velocity Vp, and then is decelerated and stops. The target velocity for each position can be set such that the velocity and operation of the carriage 3 moderately change without a sharp change. The printing velocity Vp is changed in accordance with the printing efficiency and the printing quality. For example, when the printing efficiency is prioritized, the target velocity Vp is set at a high velocity. When the printing quality is prioritized, the printing velocity Vp is set at a low velocity.

During the movement of the carriage 3, the printing control unit 25 calculates the actual position and actual velocity of the carriage 3 from the detection results of the encoder sensor 9. The printing control unit 25 increases or decreases the duty ratio in accordance with the difference between the target velocity at the actual position and the actual velocity. For example, if the actual velocity has not reached the target velocity, the duty ratio is increased. To the contrary, if the actual velocity exceeds the target velocity, the duty ratio is decreased.

<Movement Mode of Carriage and Control Mode of Carriage Motor>

The basic movement mode of the carriage 3 includes forward movement from a stop position (to be sometimes referred to as a home position (HP)) at the right end of the movement range to the left end and backward movement from a stop position at the left end of the movement range to the right end. The movement direction in the forward movement of the carriage 3 may be referred to as the forward direction, and the movement direction in the backward movement may be referred to as the backward direction.

Figure 5A:
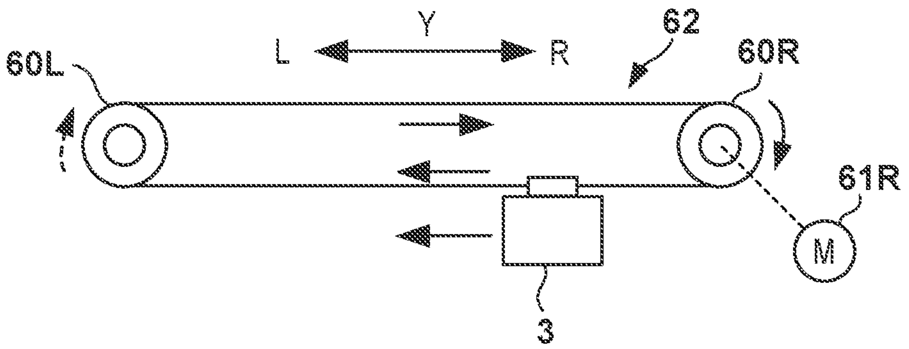
FIGS. 5A to 5C are views showing examples of control modes of carriage motors.
Figure 5B:
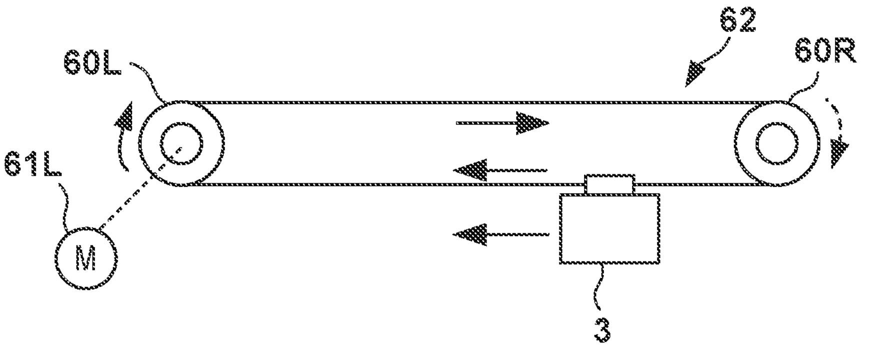
Figure 5C:
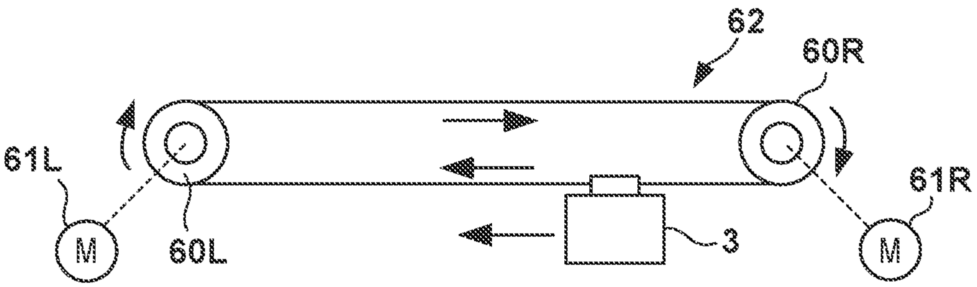

For the movement of the carriage 3 as described above, in this embodiment, it is possible to select, as the control mode of the carriage motors 61R and 61L, one control mode from a plurality of control modes. FIGS. 5A to 5C are views showing examples of the control modes of the carriage motors 61R and 61L. Among arrows each indicating the rotation direction of each of the pulleys 60R and 60L, a solid arrow indicates driving-rotation, and a broken arrow indicates driven-rotation.

The control mode shown in FIG. 5A is a control mode for moving the carriage 3 by the driving force of the carriage motor 61R alone (this is sometimes referred to as single driving). The carriage motor 61L is not driven. When the carriage motor 61R is rotated in one direction (defined as a forward direction), the pulley 60R is rotated clockwise as shown in FIG. 5A, and the carriage 3 can be moved in the forward direction. When the carriage motor 61R is rotated in a backward direction, the pulley 60R is rotated counterclockwise, and the carriage 3 can be moved in the backward direction.

The control mode shown in FIG. 5B is a control mode for moving the carriage 3 by the driving force of the carriage motor 61L alone (this is also one example of single driving). The carriage motor 61R is not driven. When the carriage motor 61L is rotated in one direction (defined as a forward direction), the pulley 60L is rotated clockwise as shown in FIG. 5B, and the carriage 3 can be moved in the forward direction. When the carriage motor 61L is rotated in a backward direction, the pulley 60L is rotated counterclockwise, and the carriage 3 can be moved in the backward direction.

The control mode shown in FIG. 5C is a control mode for moving the carriage 3 by the driving forces of both the carriage motors 61R and 61L (this is sometimes referred to as twin driving). When both the carriage motors 61R and 61L are rotated in the forward direction, the pulleys 60R and 60L are rotated clockwise as shown in FIG. 5C, and the carriage 3 moves in the forward direction. When the carriage motors 61R and 61L are rotated in a backward direction, the pulleys 60R and 60L are rotated counterclockwise, and the carriage 3 moves in the backward direction. In the control mode of driving both the carriage motors 61R and 61L, it is possible to obtain twice the torque obtained in the control mode of driving one of the carriage motors 61R and 61L. Accordingly, in the control mode shown in FIG. 5C, the carriage 3 can be moved at the highest velocity. In the control mode shown in each of FIGS. 5A and 5B, the moving velocity of the carriage 3 is lower than that in the control mode shown in FIG. 5C.

It can be said that the control modes shown in FIGS. 5A to 5C are control modes having different output ratios (output torque ratios in this embodiment) between the carriage motors 61R and 61L. In the control mode shown in FIG. 5A, the output ratio between the carriage motors 61R and 61L is 1:0. In the control mode shown in FIG. 5B, the output ratio between the carriage motors 61R and 61L is 0:1. In the control mode shown in FIG. 5C, the output ratio between the carriage motors 61R and 61L is 1:N (or N: 1). A representative example of the control mode shown in FIG. 5C is an example in which the output ratio between the carriage motors 61R and 61L is set to 1:1. The control mode shown in FIG. 5C is an example in which the output ratio between the carriage motors 61R and 61L is set to 1:2 or 2:1. The output ratio can be referred to as the ratio between the duty ratio of PWM control for the carriage motor 61R and that for the carriage motor 61L.

<Adjustment of Degree of Priority of Printing Efficiency and Degree of Priority of Printing Accuracy>

The control mode of the carriage motors 61R and 61L can influence the printing efficiency and the printing accuracy. In the example of twin driving shown in FIG. 5C, since a larger output can be obtained, the carriage 3 can be moved at a higher velocity. However, since both of the two carriage motors 61R and 61L are driven in twin driving, a vibration may increase. An increase in vibration may cause degradation of the landing accuracy of ink discharged from the printhead 2, and decrease the printing accuracy (printing quality). On the other hand, the example of single driving shown in each of FIGS. 6A and 6B has the inverse characteristics of the characteristics in twin driving with respect to the printing efficiency and the printing accuracy. That is, this example is disadvantageous in high-velocity movement of the carriage 3 but advantageous in the influence of the vibration on the landing accuracy.

When a user instructs the printing apparatus 1 to perform printing, the required specifications may be different for the printing contents. For example, when drawing a large number of line drawings such as a CAD drawing, the printing velocity is prioritized over the image quality. To the contrary, when performing printing of photographic images or the like which require the high image quality although the print sheet count is small, the printing quality is prioritized even with a longer time.

Figures 6A, 6B:
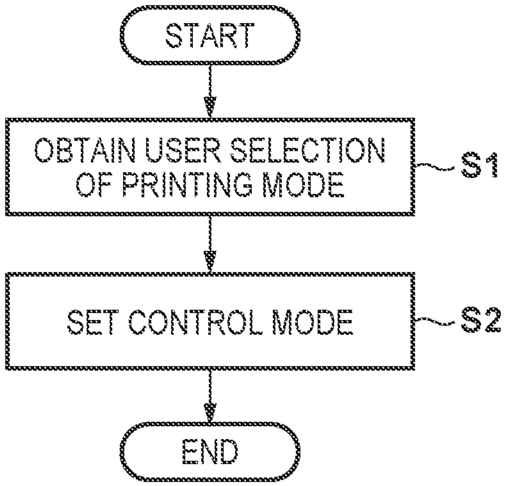
FIG. 6A is a flowchart showing an example of processing for setting the control mode.
FIG. 6B is a table showing an example of the correspondence relationship between the printing condition (printing mode) and the control mode.

In this embodiment, the control mode of the carriage motors 61R and 61L is selected in accordance with the printing condition. An example of this will be described with reference to FIGS. 6A and 6B. The example shown in FIGS. 6A and 6B is an example of selecting the control mode in accordance with the printing mode serving as the printing condition. FIG. 6A shows an example of processing performed by the printing control unit 25, which is an example of processing for selecting the control mode of the carriage motors. FIG. 6B is a table showing the correspondence relationship between the printing mode and the control mode.

Referring to FIG. 6A, in step S1, the type of the printing mode selected by the user is obtained. The user can select the printing mode using, for example, the host computer 200. The selection result is stored in, for example, the storage unit 22. In step S1, the printing control unit 25 obtains the selection result stored in the storage unit 22. In step S2, the control mode corresponding to the type of the printing mode obtained in step S1 is selected. The control mode is selected in accordance with the correspondence relationship shown in FIG. 6B. The information shown in FIG. 6B is stored in, for example, a storage device of the printing control unit 25.

In the example shown in FIG. 6B, there are three types of printing modes including "fast", "normal", and "beautiful". In "beautiful", the printing velocity Vp of the carriage 3 is set to a low velocity and printing with high accuracy is performed. That is, the printing quality is prioritized. In "fast", the printing velocity Vp of the carriage 3 is set to a high velocity to shorten the printing time. That is, the printing efficiency is prioritized. "Normal" is an intermediate mode between these modes.

Here, as has been described above, a larger output can be obtained in twin driving than in single driving, so that the carriage 3 can be moved at a high velocity and the printing time can be shortened. On the other hand, in twin driving, the cogging torque and torque ripple (to be collectively referred to as torque ripple hereinafter) generated from the motor may affect the landing accuracy, and the influence of the torque ripple is larger than in single driving.

If "fast" is selected as the printing mode, in order to move the carriage 3 at a higher velocity, twin driving is selected as the control mode. The output ratio between the carriage motors 61R and 61L is 1:1. This output ratio is implemented by, for example, setting the duty ratio of PWM control for the carriage motor 61R and that of the carriage motor 61L to the same ratio.

If "normal" is selected as the printing mode, the carriage 3 is moved at an intermediate velocity to prevent a large decrease in landing accuracy. Therefore, twin driving is selected as the control mode but the output ratio between the carriage motors 61R and 61L is set to 2:1 (or 1:2). This is implemented by, for example, setting the ratio between the duty ratio of PWM control for the carriage motor 61R and that for the carriage motor 61L to 2:1 (or 1:2). By controlling to slightly suppress the output of one of the carriage motors, the influence of the torque ripple is suppressed.

If "beautiful" is selected as the printing mode, the carriage 3 is moved at a lower velocity to prevent a decrease in landing accuracy. Therefore, single driving is selected as the control mode. The output ratio between the carriage motors 61R and 61L is 1:0 (or 0:1). This output ratio is implemented by not driving one of the carriage motors (the duty ratio is 0). By controlling not to drive one of the carriage motors, the influence of the torque ripple is suppressed.

Note that the three types of printing modes are used in this embodiment, but the number of the types of printing modes may be four or more or may be two. The number of types of driving modes of the carriage motors 61R and 61L may also be four or more or may be two. When two types of driving modes are used, the types may include twin driving and single driving, or may include two types of twin driving having different output ratios.

Alternative Selection Example 1 of Control Mode

Figures 7A, 7B:
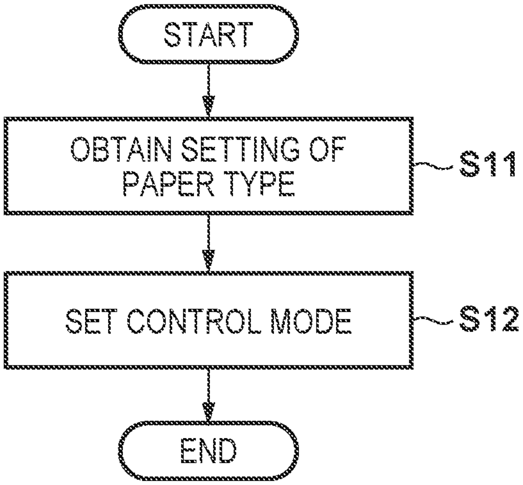
FIG. 7A is a flowchart showing another example of processing for setting the control mode.
FIG. 7B is a table showing an example of the correspondence relationship between the printing condition (paper type) and the control mode.

In the example shown in FIGS. 6A and 6B, the control mode of the carriage motors 61R and 61L is selected in accordance with the type of the printing mode, but the control mode may be selected in accordance with the type (here, paper type) of a print medium. An example of this will be described with reference to FIGS. 7A and 7B. The example shown in FIGS. 7A and 7B is an example of selecting the control mode in accordance with the paper type of the print medium serving as the printing condition. FIG. 7A shows an example of processing performed by the printing control unit 25, which is an example of processing for selecting the control mode of the carriage motors. FIG. 7B is a table showing the correspondence relationship between the paper type and the control mode.

In step S11, the setting of the paper type is obtained. For example, the user selects the paper type, and the selection result is stored in, for example, the storage unit 22. In step S11, the printing control unit 25 obtains the selection result stored in the storage unit 22. In step S12, the control mode corresponding to the setting of the paper type obtained in step S11 is selected. The control mode is selected in accordance with the correspondence relationship shown in FIG. 7B. The information shown in FIG. 7B is stored in, for example, the storage device of the printing control unit 25.

In the example shown in FIG. 7B, there are three paper types including "plain paper", "coated paper", and "glossy paper". If "plain paper" is selected, it is considered that the user expects the printing velocity rather than the image quality. "Glossy paper" is often used for printing a photographic image. If "glossy paper" is selected, it is considered that the user expects the high image quality. "Coated paper" is an intermediate type between these paper types.

If "plain paper" is selected as the paper type, in order to move the carriage 3 at a higher velocity, twin driving is selected as the control mode. The output ratio between the carriage motors 61R and 61L is 1:1. If "coated paper" is selected as the paper type, the carriage 3 is moved at an intermediate velocity to prevent a large decrease in landing accuracy. Therefore, twin driving is selected as the control mode but the output ratio between the carriage motors 61R and 61L is set to 2:1 (or 1:2). By controlling to slightly suppress the output of one of the carriage motors, the influence of the torque ripple is suppressed. If "glossy paper" is selected as the paper type, the carriage 3 is moved at a lower velocity to prevent a decrease in landing accuracy. Therefore, single driving is selected as the control mode. The output ratio between the carriage motors 61R and 61L is 1:0 (or 0:1).

Note that the three paper types are used in this selection example, but the number of the paper types may be four or more or may be two. The number of types of driving modes of the carriage motors 61R and 61L may also be four or more or may be two. When two types of driving modes are used, the types may include twin driving and single driving, or may include two types of twin driving having different output ratios.

Alternative Selection Example 2 of Control Mode

Figures 8A, 8B:
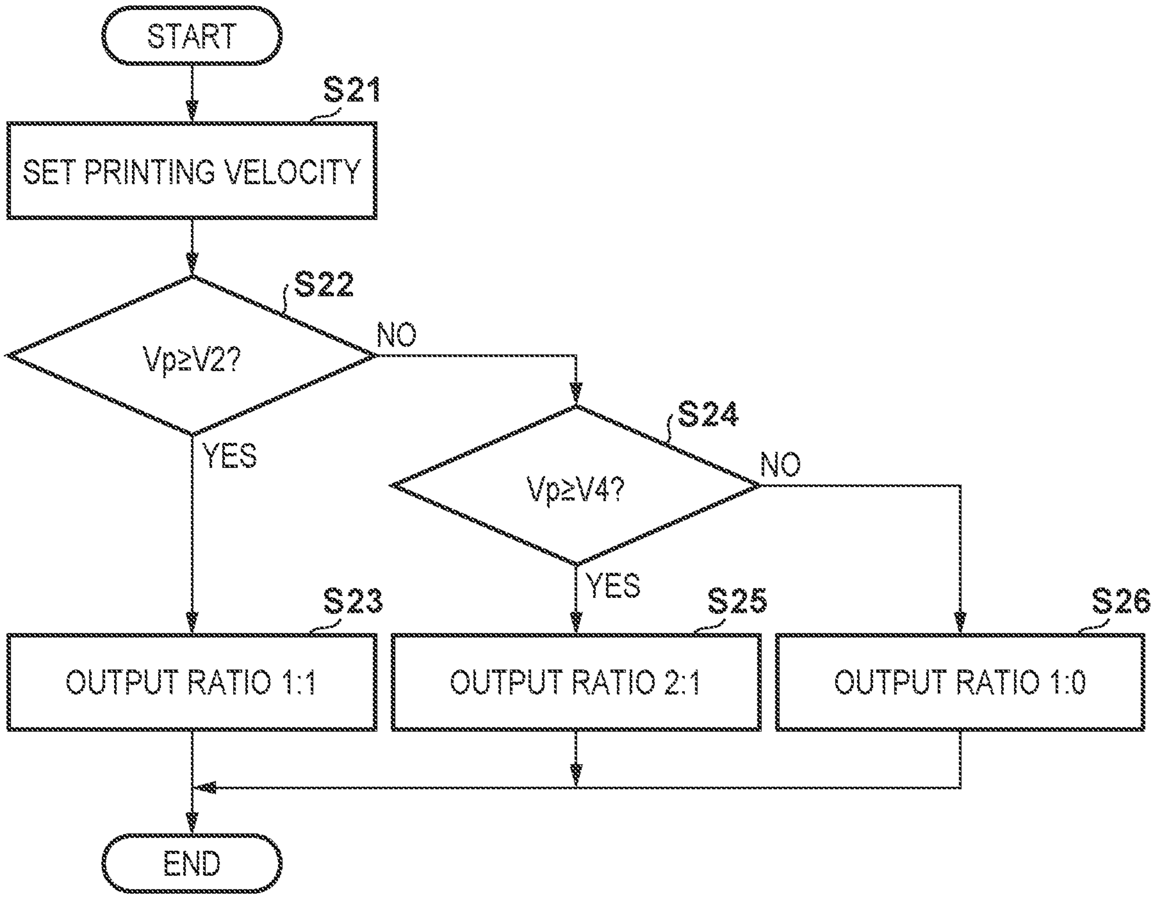
FIG. 8A is a flowchart showing still another example of processing for setting the control mode.
FIG. 8B is a table showing an example of the correspondence relationship between the paper type and the printing mode and the velocity of the carriage.

The control mode of the carriage motors 61R and 61L may be selected in accordance with the moving velocity (printing velocity Vp) of the carriage 3. An example of this will be described with reference to FIGS. 8A and 8B. The example shown in FIGS. 8A and 8B is an example of selecting the control mode in accordance with the moving velocity of the carriage 3 serving as the printing condition. FIG. 8A shows an example of processing performed by the printing control unit 25, which is an example of processing for selecting the control mode of the carriage motors. FIG. 8B is a table showing the relationship between the printing mode and the paper type and the printing velocity Vp of the carriage 3.

First, with reference to FIG. 8B, the relationship (velocity table) between the printing mode and the paper type and the printing velocity Vp of the carriage 3 will be described. In this selection example, the printing velocity Vp is set based on the type of the printing mode and the paper type selected by the user. As in the example shown in FIGS. 6A and 6B, there are three types of printing modes including "fast", "normal", and "beautiful". As in the example shown in FIGS. 7A and 7B, there are three paper types including "plain paper", "coated paper", and "glossy paper".

If the printing mode selected by the user is "fast" and the paper type selected by the user is "plain paper", the printing velocity Vp is set to V1. If the printing mode selected by the user is "beautiful" and the paper type selected by the user is "glossy paper", the printing velocity Vp is set to V5. The relationship among printing velocities V1 to V5 is expressed as V1>V2>V3>V4>V5. V1 is the highest velocity, and V5 is the lowest velocity. Among combinations of the printing modes and the paper types, the combination having more importance on the printing accuracy has the lower printing velocity Vp, and the combination having more importance on the printing efficiency has the higher printing velocity Vp.

Referring to FIG. 8A, in step S21, the type of the printing mode and the paper type selected by the user are obtained, and the printing velocity Vp is set in accordance with the relationship shown in FIG. 8B. In step S22, it is determined whether the printing velocity Vp set in step S21 is V2 or higher (V1 or V2). If the printing velocity Vp is V2 or higher, the process advances to step S23. If the printing velocity Vp is lower than V2, the process advances to step S24. In step S23, since it is requested to move the carriage 3 at a high velocity, twin driving is selected as the control mode. The output ratio between the carriage motors 61R and 61L is 1:1.

In step S24, it is determined whether the printing velocity Vp set in step S21 is V4 or higher (V3 or V4). If the printing velocity Vp is V4 or higher, the process advances to step S25. If the printing velocity Vp is lower than V4, the process advances to step S26. In step S25, since it is requested to move the carriage 3 at an intermediate velocity and prevent a large decrease in landing accuracy, twin driving is selected as the control mode. The output ratio between the carriage motors 61R and 61L is 2:1 (or 1:2). By controlling to slightly suppress the output of one of the carriage motors, the influence of the torque ripple is suppressed.

In step S26, since it is requested to move the carriage 3 at a lower velocity and prevent a decrease in landing accuracy, single driving is selected as the control mode. The output ratio between the carriage motors 61R and 61L is 1:0 (or 0:1). By controlling not to drive one of the carriage motors, the influence of the torque ripple is suppressed.

Note that in this embodiment, the printing velocity Vp is distinguished in two stages, but it may be distinguished in three or more stages. The number of types of driving modes of the carriage motors 61R and 61L may be four or more or may be two. When two types of driving modes are used, the types may include twin driving and single driving, or may include two types of twin driving having different output ratios.

Second Embodiment

When single driving is selected as the driving mode of carriage motors 61R and 61L, one of the carriage motors 61R and 61L is selected and driven. If the same motor is always driven in single driving, the deterioration of the motor progresses more easily, and the life becomes shorter than that of the motor which is not driven. In this embodiment, the characteristics of the carriage motors 61R and 61L are measured and, based on the measurement results, the carriage motor to be driven in single driving is selected. With this, it is possible to avoid that the life of one of the carriage motors 61R and 61L becomes much shorter than the life of the other one.

The characteristic to be measured is, for example, a characteristic which serves as a measure of the degradation of the motor. In this embodiment, the characteristic related to the output of the carriage motor is measured. If the output of the carriage motor decreases, it can be considered that the deterioration of the motor is progressing.

Figure 9A:
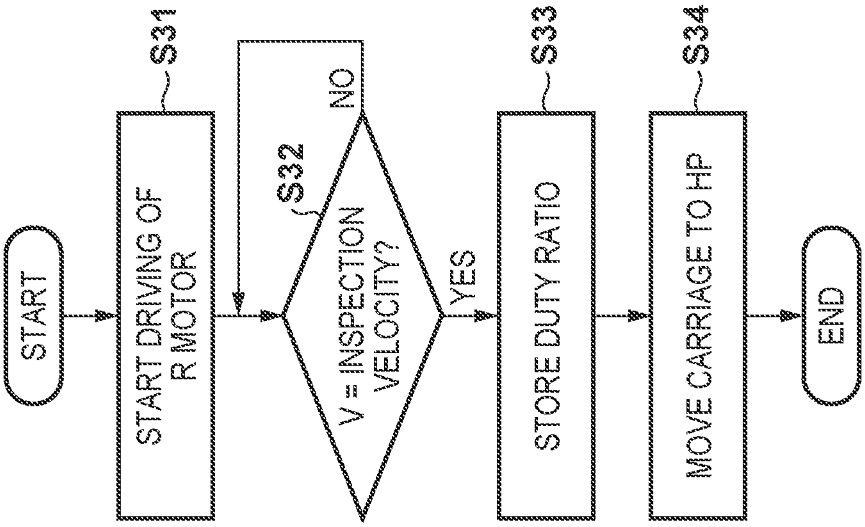
FIGS. 9A and 9B are flowcharts each showing an example of processing for measuring the characteristic of a motor.
Figure 9B:
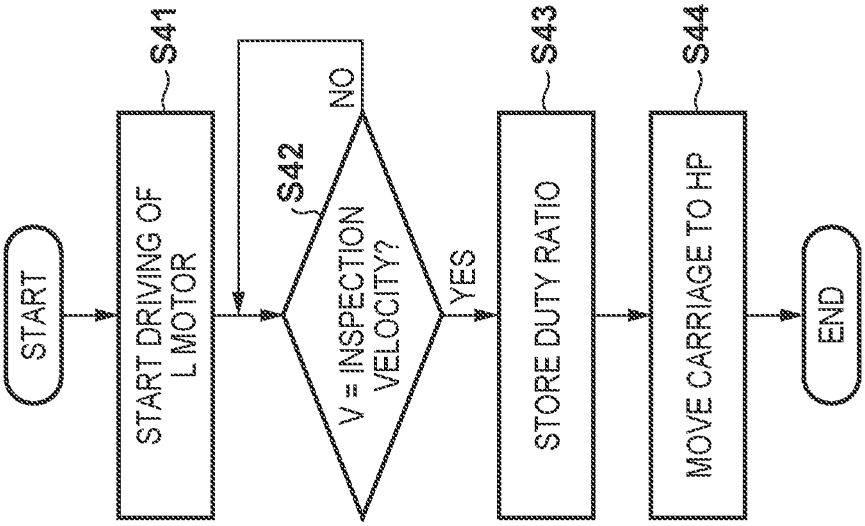
Figure 9C:
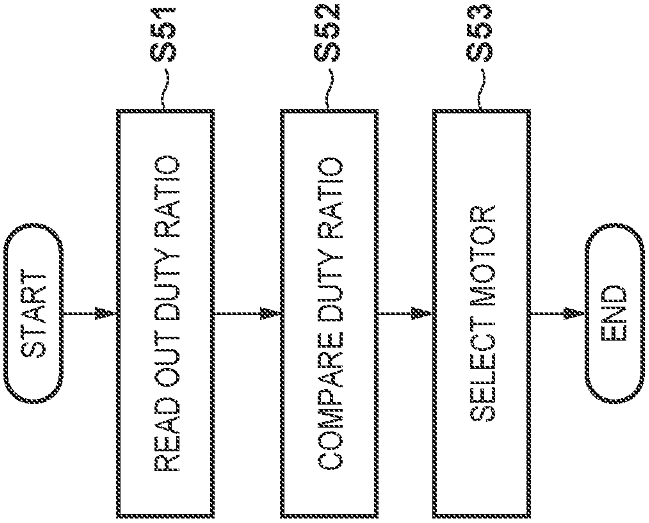
FIG. 9C is a flowchart showing an example of motor selection processing.

FIG. 9A is a flowchart showing an example of processing for measuring the characteristic of the carriage motor 61R. FIG. 9B is a flowchart showing an example of processing for measuring the characteristic of the carriage motor 61L. FIG. 9C is a flowchart showing an example of processing for selecting, based on the measurement results obtained in FIGS. 9A and 9B, the motor to be driven in single driving. These processing operations are performed by, for example, a printing control unit 25. These processing operations may be performed when a printing apparatus 1 is activated (during an initialization process of the apparatus upon power-on). Further, these processing operations may be performed before a printing operation in single driving is performed after single driving is selected. Further, these processing operations may be performed when one print job ends. Further, the processing operation shown in each of FIGS. 9A and 9B may be performed in parallel with a printing operation in single driving (in this case, the inspection velocity to be described later can be replaced with a printing velocity Vp).

The processing example shown in FIG. 9A will be described. In step S31, the target velocity of a carriage 3 is set as the inspection velocity, and driving of the carriage motor 61R (R motor) is started. For example, the moving velocity of the carriage 3, that can be achieved when driving the carriage motor 61R with the duty ratio of PWM control set to 50%, is used as the inspection velocity. The carriage 3 is moved in, for example, a forward direction. The carriage motor 61L is not driven.

In step S32, the actual velocity of the carriage 3 is calculated based on detection results of an encoder sensor 9, and it is determined whether the actual velocity of the carriage 3 is equal to the inspection velocity. The determination here can be made based on, for example, whether the actual velocity of the carriage 3 is maintained at the inspection velocity for a predetermined time (several sec). If it is determined that the actual velocity of the carriage 3 is equal to the inspection velocity, the process advances to step S33, and the duty ratio is stored as the control information of the carriage motor 61R. The duty ratio can be stored in, for example, a storage device of the printing control unit 25. With this, the relationship between the inspection velocity and the control information (duty ratio) can be obtained as the characteristic of the carriage motor 61R. In step S34, the carriage 3 is moved to a home position, and the measurement is terminated.

Assume a case in which the moving velocity of the carriage 3, that can be achieved when driving the carriage motor 61R with the duty ratio of 50%, is set as the inspection velocity and the duty ratio stored in step S33 is 60%. In this case, the current carriage motor 61R cannot obtain the output equal to that of the carriage motor 61R in the initial use stage unless the duty ratio is increased. Accordingly, it can be estimated that the deterioration of the carriage motor 61R is progressing.

The processing example shown in FIG. 9B will be described. The processing example shown in FIG. 9B is similar to the processing example shown in FIG. 9A except that the measurement target is the carriage motor 61L. In step S41, the target velocity of a carriage 3 is set as the inspection velocity, and driving of the carriage motor 61L (L motor) is started. Similar to the example shown in FIG. 9A, the moving velocity of the carriage 3, that can be achieved when driving the carriage motor 61L with the duty ratio of PWM control set to 50%, is used as the inspection velocity. The carriage 3 is moved in, for example, the forward direction. The carriage motor 61R is not driven.

In step S42, the actual velocity of the carriage 3 is calculated based on detection results of the encoder sensor 9, and it is determined whether the actual velocity of the carriage 3 is equal to the inspection velocity. If it is determined that the actual velocity of the carriage 3 is equal to the inspection velocity, the process advances to step S43, and the duty ratio is stored as the control information of the carriage motor 61L. The duty ratio can be stored in, for example, the storage device of the printing control unit 25. With this, the relationship between the inspection velocity and the control information (duty ratio) can be obtained as the characteristic of the carriage motor 61L. In step S44, the carriage 3 is moved to the home position, and the measurement is terminated.

The processing example shown in FIG. 9C will be described. In step S51, the duty ratio of the carriage 61R stored in step S33 and the duty ratio of the carriage motor 61L stored in step S43 are read out. In step S52, the duty ratios read out in step S51 are compared with each other. In this embodiment, it is assumed that the same product is used as the carriage motors 61R and 61L. Therefore, if the same inspection velocity is used in the respective characteristic measurements of the carriage motors 61R and 61L (FIGS. 9A and 9B), it can be estimated that the motor with the higher duty ratio is more deteriorated.

In step S53, based on the comparison result in step S52, the carriage motor to be driven in single driving is selected. The motor to be selected is the motor having the high output characteristic. More specifically, of the carriage motors 61R and 61L, the motor with the lower duty ratio is selected. If the superiority or inferiority of the carriage motors 61R and 61L cannot be determined, either one may be selected by lottery. In single driving in the next printing operation, the carriage motor selected in step S53 is driven.

Note that in step S52, the duty ratios of the carriage motors 61R and 61L are compared with each other, but the comparison method is not limited to this. For example, the reference value of the duty ratio may be set for each of the carriage motors 61R and 61L, and each duty ratio may be compared with the corresponding reference value. The reference value may be the duty ratio that achieved the inspection velocity in the use start period of each of the carriage motors 61R and 61L. Then, the motor having the smaller difference between the reference value and the duty ratio may be used. For example, if the difference between the duty ratio and the reference value is D1 for the carriage motor 61R and the difference between the duty ratio and the reference value is D2 (<D1) for the carriage motor 61L, the carriage motor 61L is selected in step S53.

Figure 10:
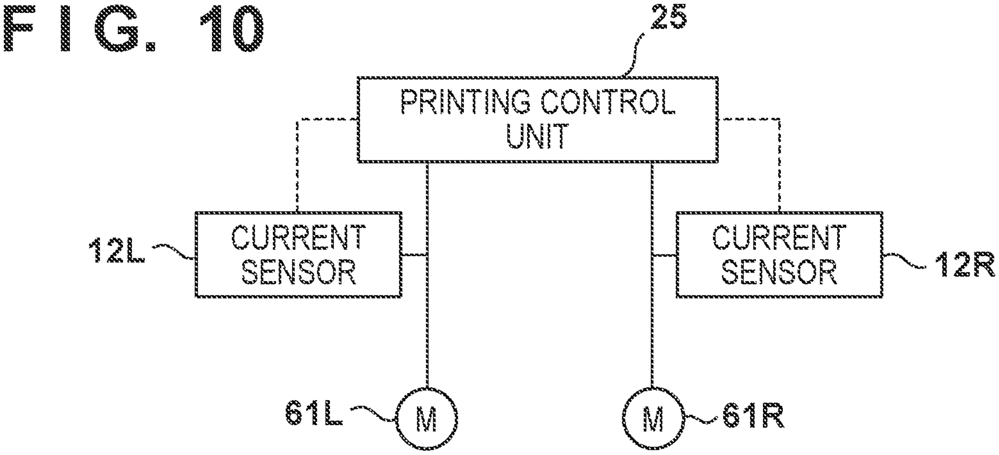
FIG. 10 is an explanatory view showing an example of characteristic measurement of the motor using a current sensor.

The characteristic measurement of the carriage motor may be performed using, as the reference, a parameter other than the control information such as the duty ratio. Another energy amount such as the current value or the voltage value supplied to the motor may be measured. FIG. 10 is a block diagram showing an arrangement example in which the current values supplied to the carriage motors 61R and 61L are measured by current sensors 12R and 12L, respectively. The printing control unit 25 can obtain measurement results of the current sensors 12R and 12L. In place of the duty ratios, the current values supplied to the carriage motors when the carriage 3 reaches the inspection velocity are stored in steps S33 and S43, and they are compared with each other. The carriage motor with the smaller current value can be selected as the carriage motor to be driven in single driving. In the arrangement example using the current sensors 12R and 12L, control other than PWM control can also be used.

Third Embodiment

In twin driving with the output ratio of 1:1, if the output of one of carriage motors 61R and 61L largely decreases due to the deterioration or the like, it may be required to interrupt printing during the printing operation. For example, assume that twin driving is selected under the condition that the moving velocity of the carriage 3 is high, but the output of one of the carriage motors 61R and 61L decreases and the duty ratio of PWM control thereof reaches 100% for a predetermined time. In this case, even if the other carriage motor is normal, the printing operation must be stopped, resulting in a degradation in printing efficiency.

To prevent this, a threshold value is set to determine that the output of the carriage motor has decreased before the duty ratio reaches 100%. For example, the threshold value is the duty ratio of 80%. If the duty ratio of one of the carriage motors 61R and 61L exceeds the threshold value but the duty ratio of the other one does not exceed the threshold value, twin driving is switched to single driving using the carriage motor not exceeding the threshold value. The switching timing may be after the printing scan in which the duty ratio exceeded the threshold value and before the next printing scan.

In this case, even if the condition that the moving velocity of the carriage 3 is high is originally set, the movement condition of the carriage 3 is changed to a printing velocity Vp or the like that is possible in single driving. By changing the movement condition, the printing efficiency decreases. However, since the moving velocity of the carriage 3 is decreased, a decrease in printing accuracy can be avoided, and it is possible to provide the user with a printed material without a decrease in printing quality.

Fourth Embodiment

When single driving is selected as the driving mode of carriage motors 61R and 61L, one of the carriage motors 61R and 61L is selected and driven. If the same motor is always driven in single driving, the deterioration of the motor progresses more easily, and the life becomes shorter than that of the motor which is not driven. Further, the progress of deterioration is different between the carriage motors 61R and 61L depending on the use environment and the like. More specifically, if there is a difference between the thermal environment of the carriage motor 61R and that of the carriage motor 61L, the motor in the worse thermal environment tends to deteriorate more easily.

For example, in the layout of a printing apparatus 1 exemplarily shown in FIGS. 1 and 2, when an exterior cover is attached to and covers the printing apparatus 1, since many structures such as an ink container 5 exist around the carriage motor 61R, the heat dissipation of the carriage motor 61R may be lower than that of the carriage motor 61L. Therefore, when the temperature starts to rise due to driving of the carriage motor 61R, the warm airflow around the carriage motor 61R is difficult to flow, and the temperature around the carriage motor 61R rises sharply.

On the other hand, since fewer structures exist around the carriage motor 61L compared to the carriage motor 61R, even when the temperature starts to rise due to driving of the carriage motor 61L, the warm airflow around the carriage motor 61L flows easily. Therefore, the temperature around the carriage motor 61L does rise easily.

Here, since the positions of the carriage motors 61R and 61L are fixed, the heat dissipation in each of the arrangement portions of the carriage motors 61R and 61L can be specified in advance. It is also possible to grasp the ratio of the heat dissipation in advance. For example, an experiment is conducted in advance and, from temperature measurement results during continuous driving of the carriage motors 61R and 61L, the ratio of heat dissipation in the respective arrangement portions can be determined to be 1:n. In other words, the heat dissipation of the carriage motor 61L is n times higher than that of the carriage motor 61R.

In single driving, by selecting the carriage motors 61R and 61L in accordance with the heat dissipation ratio, it is possible to prevent that the degrees of progress of deteriorations thereof are biased. The information indicating the heat dissipation ratio of 1:n can be stored, as the ratio information defining the use ratio between the carriage motors 61R and 61L, in a storage device of a printing control unit 25. Then, for example, if the total print sheet count in a print job is k, the printing operation by driving the carriage motor 61L is performed on k×n/(1+n) sheets in accordance with the ratio information. Further, the printing operation by driving the carriage motor 61R is performed on k×1/(1+n) sheets. The higher use ratio is set for the carriage motor 61L having the high heat dissipation. More specifically, if k=100 sheets and the ratio information of the carriage motors 61R and 61L indicates 1:3, the printing operation by driving the carriage motor 61L is performed on 75 sheets, and the printing operation by driving the carriage motor 61R is performed on 25 sheets. In this manner, by switching the carriage motor to be used in single driving based on the ratio information, a decrease in life caused by the temperature rise can be reduced.

Figure 11A:
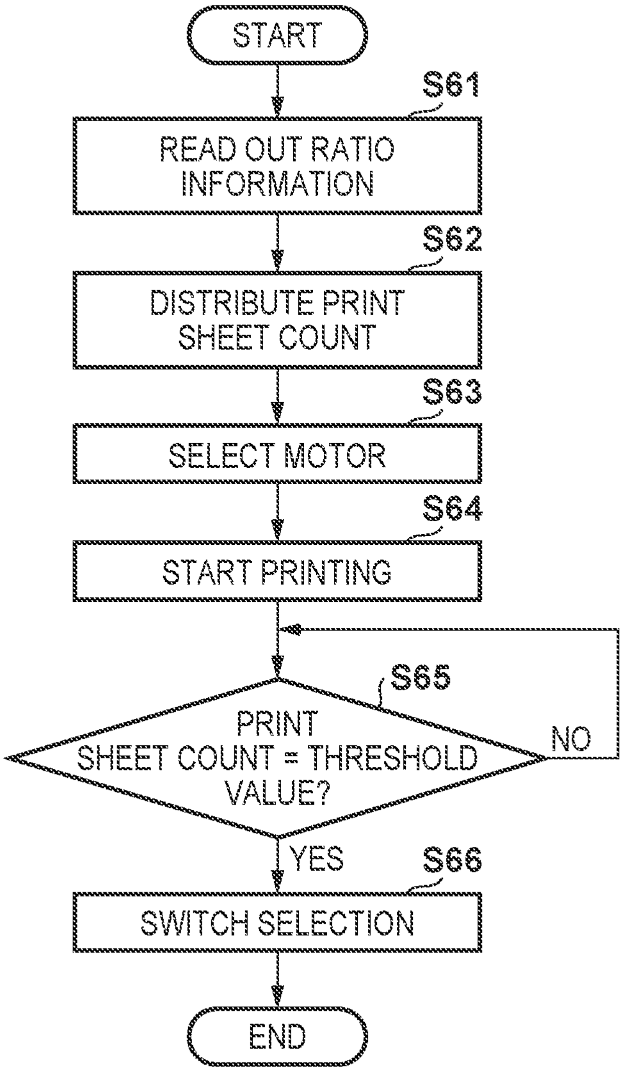
FIG. 11A is a flowchart showing an example of processing for switching, based on the ratio information, selection of the motor to be used.

FIG. 11A is a flowchart showing an example of processing performed by the printing control unit 25, which is an example of processing for switching, based on the ratio information, the carriage motor to be used in single driving. For example, this processing is performed when, after a print job is received from a host apparatus 200, single driving is selected as the control mode of the carriage motors 61R and 61L.

In step S61, the ratio information stored in advance is read out. In step S62, based on the ratio information read out in step S61, the print sheet count in the current print job is distributed. More specifically, the print medium count for the printing operation in single driving using the carriage motor 61R and the print medium count for the printing operation in single driving using the carriage motor 61L are set.

In step S63, the carriage motor to be driven first is selected from the carriage motors 61R and 61L. Here, as an example, the carriage motor 61R is driven first. In step S64, the printing operation is started. In step S65, it is determined whether the printing is completed for the print sheet count (threshold value), which is set in step S62, for the printing operation in single driving using the carriage motor 61R. If the printing is completed, the process advances to step S66, and the carriage motor driven in single driving is switched from the carriage motor 61R to the carriage motor 61L. After this, the printing operation is continued in single driving in which the carriage motor 61L is driven.

Note that in the printing operation by single driving, the carriage motor which is not driven may be cooled. For example, until it is determined in step S65 that the printing is completed for the print sheet count (threshold value) for the printing operation in single driving using the carriage motor 61R, the carriage motor 61L is cooled. With this, when the selection of the carriage motor is switched in step S66, the carriage motor 61L can be driven in a sufficiently cooled state, so that the temperature rise can be suppressed.

Figure 11B:
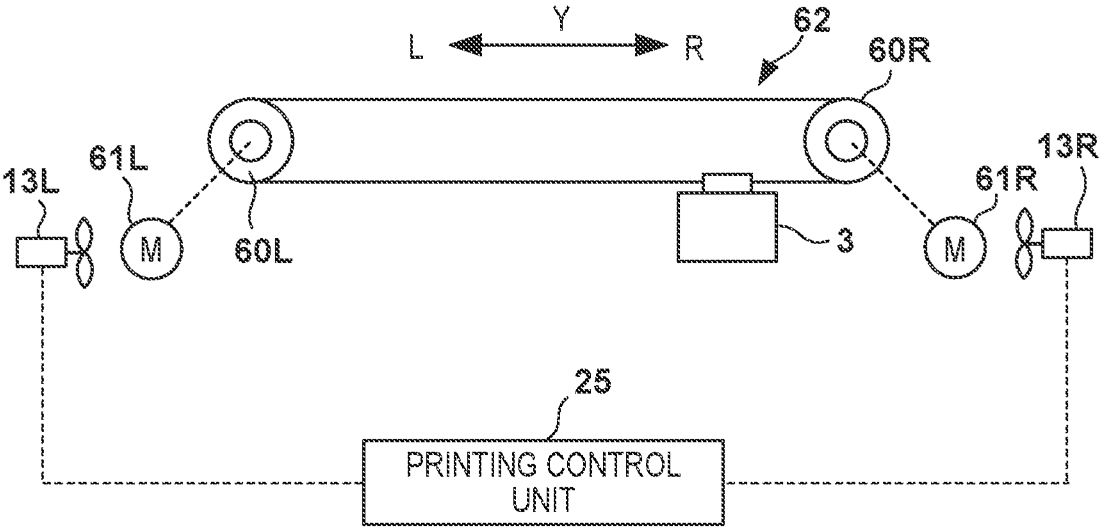
FIG. 11B is a view showing an arrangement example in which cooling units are used.

As a cooling mechanism, for example, a blower fan may be used. FIG. 11B is a schematic view showing an arrangement example in which cooling units 13R and 13L are provided. Both the cooling units 13R and 13L are fan motors and cool the carriage motors 61R and 61L, respectively, by blowing air. The cooling unit 13R is arranged to cool the carriage motor 61R, and the cooling unit 13L is arranged to cool the carriage motor 61L. Driving of each of the cooling units 13R and 13L is controlled by the printing control unit 25.

Note that the cooling units 13R and 13L may be always driven. Alternatively, one of the cooling units 13R and 13L may be provided in common for the carriage motors 61R and 61L. Further, the cooling unit may be provided only for the carriage motor with poor heat dissipation. For example, it is also possible to employ an arrangement in which only the cooling unit 13R for cooling the carriage motor 61R is provided and the cooling unit 13L is not provided.

Figure 11C:
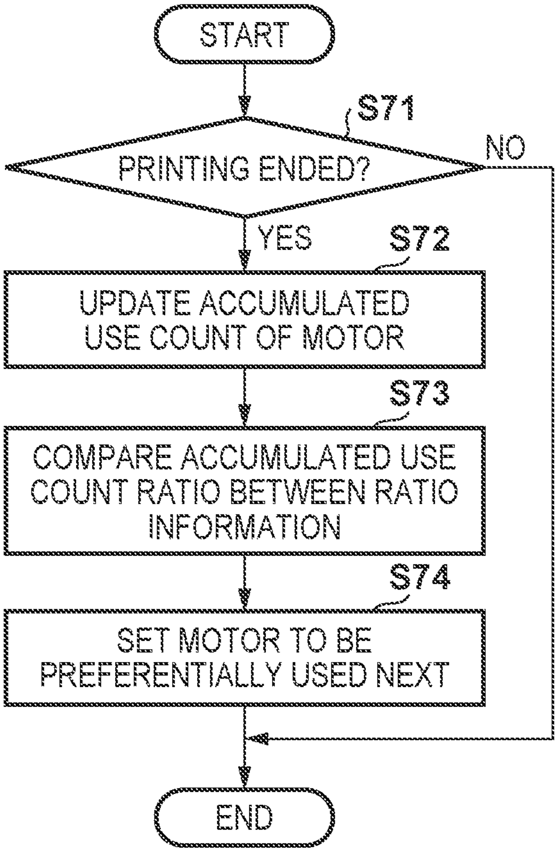
FIG. 11C is a flowchart showing an example of processing for setting, based on the ratio information, the priority of the motor to be used.

In the example shown in FIG. 11A, the selection of one of the carriage motors 61R and 61L is switched during execution of the print job. However, the timing of switching the selection may be between print jobs. FIG. 11C is a flowchart showing an example of this, which is an example of processing repeatedly performed by the printing control unit 25 during execution of a print job in single driving.

In step S71, it is determined whether the printing operation for one print job is completed. If the printing operation is completed, the process advances to step S72. If the printing operation is not completed, one process is terminated. In step S72, the accumulated use count of the motor is updated. The accumulated use count of the motor is managed for each of the carriage motors 61R and 61L, and the information thereof is stored in the storage device of the printing control unit 25. The accumulated use count of the motor indicates the accumulated value of the use counts of the carriage motor 61R or 61L driven in single driving in the execution of the current print job. For example, in the execution of the current print job, if printing was performed on 10 sheets by single driving in which the carriage motor 61R is driven, the accumulated use count of the carriage motor 61R is increased by 10.

In step S73, the accumulated use count ratio between the carriage motors 61R and 61L is compared with the ratio information. The accumulated use count ratio is expressed by, for example, the accumulated use count of the carriage motor 61R: the accumulated use count of the carriage motor 61L. Then, in step S74, based on the comparison result in step S73, the carriage motor to be preferentially used in the next single driving is set. For example, if the ratio information of the carriage motors 61R and 61L indicates 1:4 and the accumulated use count ratio is 1:3, the carriage motor 61L is set as the carriage motor to be preferentially used. If the ratio information of the carriage motors 61R and 61L indicates 1:4 and the accumulated use count ratio is 1:5, the carriage motor 61R is set as the carriage motor to be preferentially used. With this, it is possible to make the actual use ratio of the carriage motors 61R and 61L close to the ratio information.

Note that in the example shown in each of FIGS. 11A and 11C, the example has been exemplarily shown in which the ratio information is compared with the print sheet count, but the parameter to be compared with the ratio information may be another parameter such as the printing time or the power consumption of the motor. Further, in this embodiment, the ratio information is set in consideration of the heat dissipation around each of the carriage motors 61R and 61L, but the ratio information may be set based on another factor. For example, if the carriage motors 61R and 61L are different products, the ratio information may be set in accordance with the durability (service life or the like) of each of the carriage motors 61R and 61L.

Fifth Embodiment

In the fourth embodiment, the selection of the carriage motor 61R or 61L to be used in single driving is switched based on the ratio information considering the heat dissipation. In this embodiment, the selection of carriage motors 61R or 61L is switched by measuring the temperature around each of the carriage motors 61R and 61L. With this, the selection can be made in accordance with the actual thermal environment of each of the carriage motors 61R and 61L, so that the selection can be made in accordance with the environment of the installation location of a printing apparatus 1. Further, it is unnecessary to prepare the ratio information in advance.

Figure 12A:
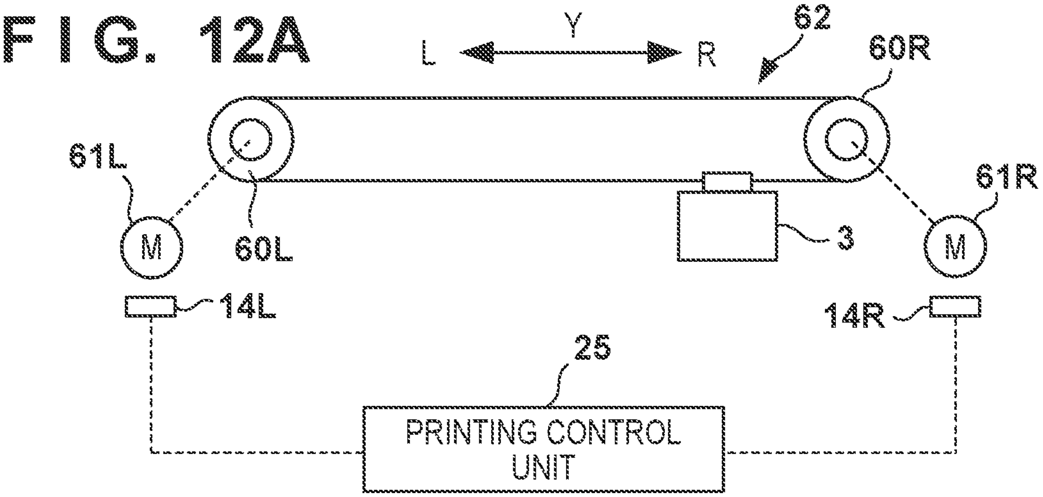
FIG. 12A is a schematic view showing an arrangement example in which temperature sensors are used.

FIG. 12A is a schematic view showing an arrangement example in which temperature sensors 14R and 14L are provided. The temperature sensor 14R measures the temperature around the carriage motor 61R, and the temperature sensor 14L measures the temperature around the carriage motor 61L. A printing control unit 25 can obtain the measurement results of the temperature sensors 14R and 14L.

Figure 12B:
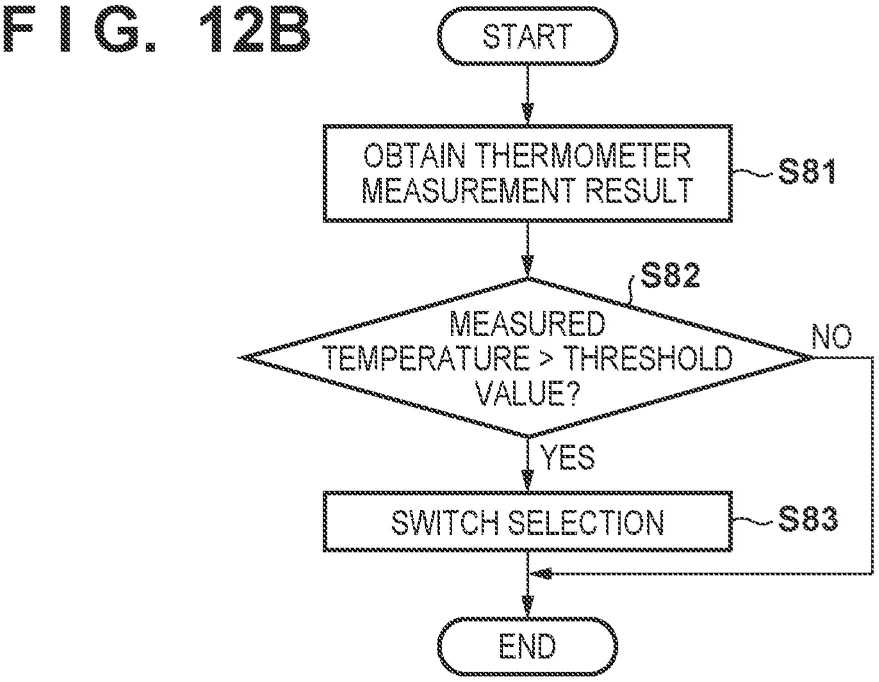
FIG. 12B is a flowchart showing an example of processing for switching selection of the motor related to the arrangement example shown in FIG. 12A.

FIG. 12B is a flowchart showing an example of processing performed by the printing control unit 25 during a printing operation, which is an example of processing for switching the carriage motor to be used in single driving based on the measurement results of the temperature sensors 14R and 14L. For example, this processing is repeatedly performed during the printing operation after a print job is received from a host apparatus 200 and single driving is selected as the control mode of the carriage motors 61R and 61L.

In step S81, the measurement result of the temperature sensor corresponding to the currently selected carriage motor is obtained. For example, when single driving is being performed using the carriage motor 61R, the measurement result of the temperature sensor 14R is obtained. When single driving is being performed using the carriage motor 61L, the measurement result of the temperature sensor 14L is obtained.

In step S82, it is determined whether the measured temperature obtained in step S81 exceeds a threshold temperature. If the measured temperature exceeds the threshold temperature, the process advances to step S83. The threshold temperature is, for example, the temperature that affects the life of the carriage motor due to the temperature rise around the carriage motor caused by driving of the carriage motor.

In step S83, the selection of the carriage motor to be driven is switched. For example, when single driving is being performed using the carriage motor 61R, the selection is switched to the carriage motor 61L. When single driving is being performed using the carriage motor 61L, the selection is switched to the carriage motor 61R. Switching of the selection of the carriage motor (in other words, switching of actual driving) can be performed, for example, between printing scans.

According to this embodiment, by the control described above, it is possible to reduce a decrease in life caused by the temperature rise of each of the carriage motors 61R and 61L.

Sixth Embodiment

Figure 13:
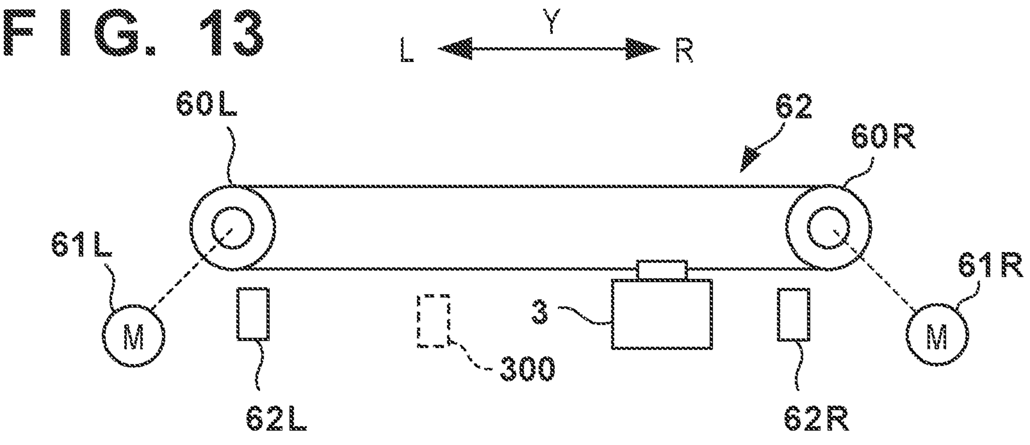
FIG. 13 is an explanatory view showing an arrangement example of abutment members and an example of an obstacle.

During a power-off state of a printing apparatus 1, the position of a carriage 3 may be changed due to a vibration during transportation or a contact with a user. Therefore, when the printing apparatus 1 is activated (powered on), it is necessary to perform a movement test to recognize the position of the carriage 3 and move the carriage 3 to a home position. In this embodiment, a stopper serving as the movement limit of the carriage 3 is provided at each end portion of the movement range of the carriage 3. FIG. 13 is a schematic view showing this. A stopper 62L defines the left end of the movement range of the carriage 3. When the carriage 3 abuts against the stopper 62L, the carriage 3 cannot move further to the left. A stopper 62R defines the right end of the movement range of the carriage 3. When the carriage 3 abuts against the stopper 62R, the carriage 3 cannot move further to the right.

In this embodiment, the movement test is performed by single driving, and the carriage 3 is first moved in the forward direction. This is because although twin driving can generate a larger output than single driving, damage may be large when the carriage 3 collides with an obstacle 300. Even in single driving, the output of the carriage motor 61R or 61L is increased stepwise from a small output to a large output. For example, the carriage motor 61R or 61L is first driven with the duty ratio of 20% and, if it is detected that the carriage 3 does not move, the duty ratio is increased.

If the duty ratio reaches 100%, it can be determined that the carriage 3 abuts against the stopper 62L (or 62R) and stops moving. Even though the duty ratio reaches 100%, since the carriage 3 has already abutted against the stopper 62L (or 62R), a collision load is not generated.

The duty ratio may reach 100% since the carriage 3 abuts against the obstacle 300 and cannot move. Whether the carriage 3 abuts against the stopper 62L (or 62R) or abuts against the obstacle 300 can be determined based on the movement distance of the carriage 3 in the movement test.

Figure 14:
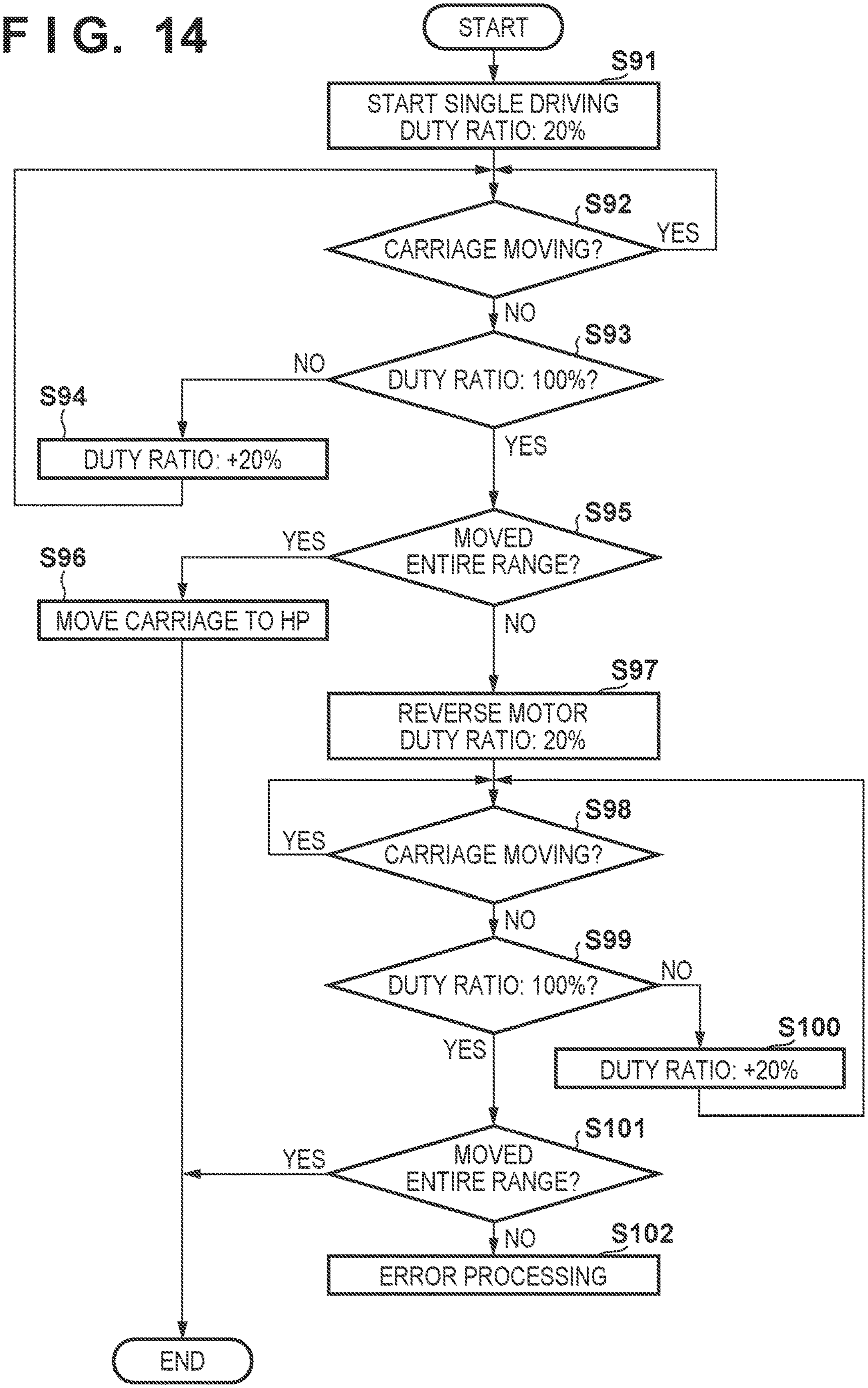
FIG. 14 is a flowchart showing an example of processing related to the movement test of a carriage.

A specific example will be described. FIG. 14 is a flowchart showing an example of processing performed by a printing control unit 25, and particularly showing an example of the movement test processing of the carriage 3. The processing shown in FIG. 14 is performed, for example, when the printing apparatus is activated. Alternatively, the processing is performed, for example, in recovery processing which is performed, after an error occurs in the printing apparatus 1, in accordance with a recovery instruction from a user or the like.

In step S91, single driving is started using one of the carriage motors 61R and 61L. The duty ratio is set to 20%, and the carriage 3 is moved in the forward direction. The carriage motor to be used may be the motor whose operation is confirmed. The motor whose operation is confirmed is the last driven motor of the carriage motors 61R and 61L. The information of the last driven motor can be stored, for example, in a storage device of the printing control unit 25.

In this embodiment, the position of the carriage 3 is recognized using a linear scale 8 and an encoder sensor 9. Accordingly, in this system, the position of the carriage 3 cannot be directly recognized. Therefore, at the time of the start of single driving, the position of the carriage 3 in the movement range is unknown.

In step S92, a detection result of the encoder sensor 9 is obtained to determine whether the carriage 3 is moving in the forward direction. If it is determined that the carriage 3 is not moving, since the carriage 3 may abut against the stopper 62L or the obstacle 300, the process advances to step S93. If it is determined that the carriage 3 is moving, the movement distance is calculated.

In step S93, it is determined whether the current duty ratio of PWM control for the carriage motor in use is 100%. If the duty ratio is not 100%, the process advances to step S94 to increase the duty ratio by 20%, and the process returns to step S92. For example, when the current duty ratio is 20% which is the initial value, the duty ratio is increased to 40%. If the duty ratio is 100%, the process advances to step S95.

In step S95, based on the distance moved by the carriage 3 since the start of the movement test, it is determined whether the carriage 3 has moved the entire range of the movement range. If it is determined that the carriage 3 has moved the entire range, this means that, in the movement test, the carriage 3 starts to move from the home position and is stopped by abutting against the stopper 62L. Thus, it is considered that no obstacle 300 exists, and the process advances to step S96. In step S96, the carriage 3 is moved to the home position, it is determined that the movement of the carriage 3 is normal, and the processing is terminated.

In step S95, if it is determined that the carriage 3 has not moved the entire range of the movement range, this means either that the carriage 3 is stopped by abutting against the obstacle 300 or that the movement start position of the carriage 3 is not the home position and the carriage 3 is stopped by abutting against the stopper 62L. Therefore, the process advances to step S97. The duty ratio of PWM control for the carriage motor in use is set to 20%, and the rotation direction of the motor is reversed to move the carriage 3 in the backward direction. In step S98, a detection result of the encoder sensor 9 is obtained to determine whether the carriage 3 is moving in the backward direction. If it is determined that the carriage 3 is not moving, since the carriage 3 may abut against the stopper 62R or the obstacle 300, the process advances to step S99. If it is determined that the carriage 3 is moving, the movement distance is calculated.

In step S99, it is determined whether the current duty ratio of PWM control for the carriage motor in use is 100%. If the duty ratio is not 100%, the process advances to step S100 to increase the duty ratio by 20%, and the process returns to step S98. For example, when the current duty ratio is 20% which is the initial value, the duty ratio is increased to 40%. If the duty ratio is 100%, the process advances to step S101.

In step S101, based on the distance moved by the carriage 3 since the start of the movement in the backward direction, it is determined whether the carriage 3 has moved the entire range of the movement range. If it is determined that the carriage 3 has moved the entire range, this means that the carriage 3 has moved from the position where it was stopped by the stopper 62L to the home position. Thus, it is considered that no obstacle 300 exists and the movement of the carriage 3 is normal. The driving of the carriage motor is stopped, and the processing is terminated. If it is determined in step S101 that the carriage 3 has not moved the entire range of the movement range, it is considered that the carriage 3 was stopped by abutting against the obstacle 300 during the forward movement or the backward movement, and the process advances to step S102. In step S102, error processing is performed. In the error processing, for example, the user is notified of the occurrence of a failure.

As has been described above, in this embodiment, an abnormality such as the existence of the obstacle 300 is checked by moving the carriage 3 in single driving. Therefore, if an abnormality exists, damage to the carriage 3 and the like can be suppressed. Particularly, by increasing the output of the carriage motor stepwise, damage to the carriage 3 and the like can be further suppressed if the abnormality exists.

Seventh Embodiment

In the first embodiment, it has been described that single driving is more advantageous than twin driving since the vibration of the carriage 3 may increase in twin driving. However, even in single driving, the vibration may change between a case of driving the carriage motor 61R and a case of driving the carriage motor 61L. Further, the vibration can be smaller in twin driving than in single driving. Furthermore, the relationship between the control mode and the degree of vibration may change due to aging of a printing apparatus 1.

In this embodiment, for each control mode of a plurality of control modes, the velocity fluctuation amount during constant-velocity movement of a carriage 3 is measured, and the relationship between each control mode and the degree of vibration is specified. Based on the specifying result, the relationship between the control mode and the printing condition is updated.

In this embodiment, three types of control modes are assumed, one of which is twin driving (the output ratio is 1:1), the other one is single driving R (a carriage motor 61R is used), and the remaining one is single driving L (a carriage motor 61L is used).

Figure 15:
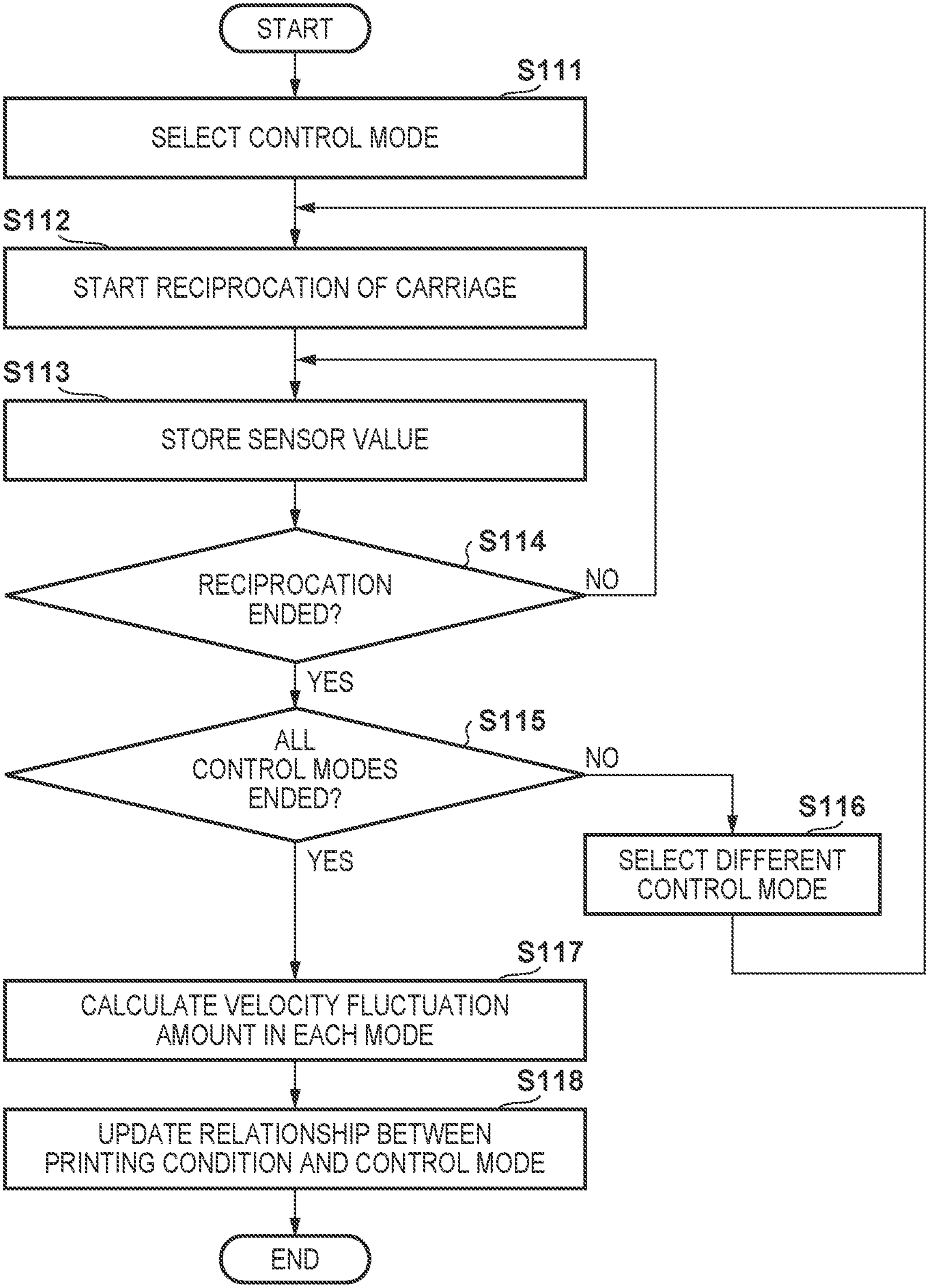
FIG. 15 is a flowchart showing an example of processing for measuring the velocity fluctuation amount of a carriage.

FIG. 15 is a flowchart showing an example of processing performed by a printing control unit 25, which is an example of processing for measuring the velocity fluctuation amount and updating the relationship between the control mode and the printing condition.

In step S111, one of the three types of control modes is selected. In step S112, the forward movement and backward movement of the carriage 3 are started in the control mode selected in step S111. In the constant velocity range in each of the forward movement and the backward movement, the carriage 3 is moved at a predetermined velocity. In step S113, detection results of an encoder sensor 9 in the constant velocity range in each of the forward movement and the backward movement are stored in a storage device of the printing control unit 25. In step S114, it is determined whether the forward movement and backward movement of the carriage 3 are completed. If they are completed, the process advances to step S115.

In step S115, it is determined whether the processing from step S112 to step S114 has been performed for all the three types of control modes. If the processing has not been performed for all of them, the process advances to step S116. In step S116, the unselected control mode is selected and the process returns to step S112.

In step S117, from the detection results of the encoder sensor 9 stored for each control mode in step S113, the velocity fluctuation amount in the constant velocity range in each control mode is calculated. In step S118, the relationship between the printing condition and the control mode is updated, and the processing is terminated.

An example of update of the relationship in step S118 will be described. Assume that, as the result of calculation in step S117, the velocity fluctuation amounts in the three types of control modes are smaller in the order of single driving R, single driving L, and twin driving. Single driving R with the smallest velocity fluctuation amount is advantageous in printing accuracy because the vibration is small. When the printing modes include "fast", "normal", and "beautiful" as in the example shown in FIG. 6B, twin driving can be assigned to "fast", single driving L can be assigned to "normal", and single driving R can be assigned to "beautiful".

Next, assume that, as the result of calculation in step S117, the velocity fluctuation amounts in the three types of control modes are smaller in the order of twin driving, single driving R, and single driving L. Twin driving with the smallest velocity fluctuation amount is advantageous in printing accuracy because the vibration is small. Twin driving is also advantageous in moving velocity of the carriage 3 in the first place. When the printing modes include "fast", "normal", and "beautiful" as in the example shown in FIG. 6B, twin driving can be assigned to "fast", single driving L or single driving R can be assigned to "normal", and twin driving can be assigned to "beautiful".

As has been described above, by updating the relationship between the printing condition and the control mode, it is possible to select the optimum control mode for the printing condition in accordance with the individual difference of the printing apparatus 1 and changes in characteristics over time.

Note that in the example shown in FIG. 15, one forward movement and one backward movement of the carriage 3 are performed. However, the present invention is not limited to this, and the carriage 3 may be moved a plurality of times. The timing of performing the processing shown in FIG. 15 can be, for example, during an initialization process upon activation (power-on) of the printing apparatus 1. The timing of performing the processing shown in FIG. 15 can also be at the time of replacement of the carriage 3, at the time of shipment of the carriage 3 from the factory, or at the time of checking the movement operation of the carriage 3 upon recovery after an error occurrence. Further, the timing of processing shown in FIG. 15 can be when the print sheet count has reached a predetermined sheet count or the printing operation count has reached a predetermined count in the printing apparatus 1, or when the total operation time of the carriage 3 has reached a predetermined time.

Figure 16:
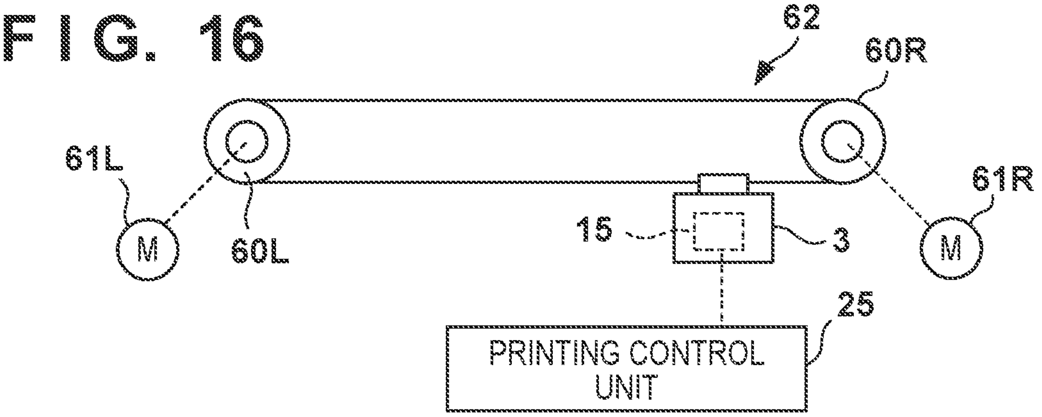
FIG. 16 is a schematic view showing an arrangement example in which an acceleration sensor is used.

The velocity fluctuation amount of the carriage 3 may be measured by a method other than the encoder sensor 9. FIG. 16 is a schematic view showing an example of this. In the example shown in FIG. 16, an acceleration sensor 15 is mounted on the carriage 3, and the printing control unit 25 can obtain a measurement result of the acceleration sensor 15. In this arrangement, the acceleration of the carriage 3 under constant-velocity control may be measured, and the velocity fluctuation amount may be calculated from the measured acceleration.

Eighth Embodiment

A printing apparatus 1 forms an image by discharging ink droplets from a printhead 2 to form dots on a print medium, thereby forming an image. The actual position of the dot may be shifted from the target position of the dot on control. The dot alignment technique is referred to as a registration correction technique, and dot alignment is implemented by applying this correction. In a technique for automating registration correction, it is known that a sensor for reading the actual dot position is provided in a carriage 3.

Figure 17A:
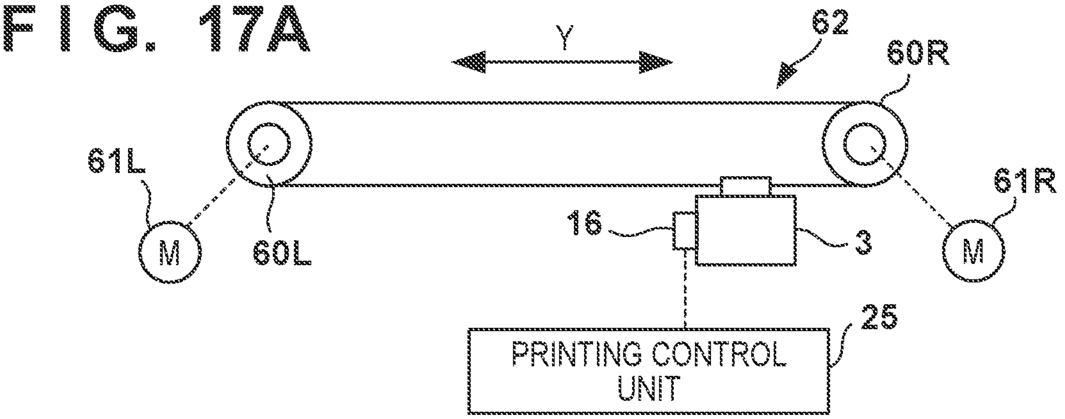
FIG. 17A is a schematic view showing an arrangement example in which a reading sensor is used.
Figure 17B:
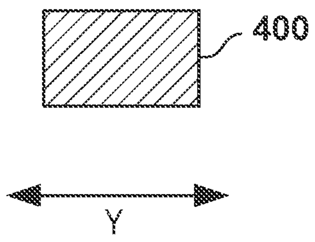
FIG. 17B is a view showing an example of a registration adjustment pattern.

FIG. 17A is a schematic view showing an example of this. A reading sensor 16 is provided in the carriage 3. The reading sensor 16 is, for example, a reflective optical sensor, which applies light onto a print medium and detects the received light intensity of reflected light. FIG. 17B shows an example of a registration adjustment pattern to be printed on a print medium. A pattern 400 shown in FIG. 17B is a rectangular pattern having uniform density. The length of the pattern 400 in the main-scanning direction (Y direction) is set larger than the detection region of the reading sensor 16 on the print medium. In order to make the signal sharply rise upon detection, the shape of the pattern 400 is a rectangle so as to have an edge orthogonal to the main-scanning direction Y.

Figure 17C:
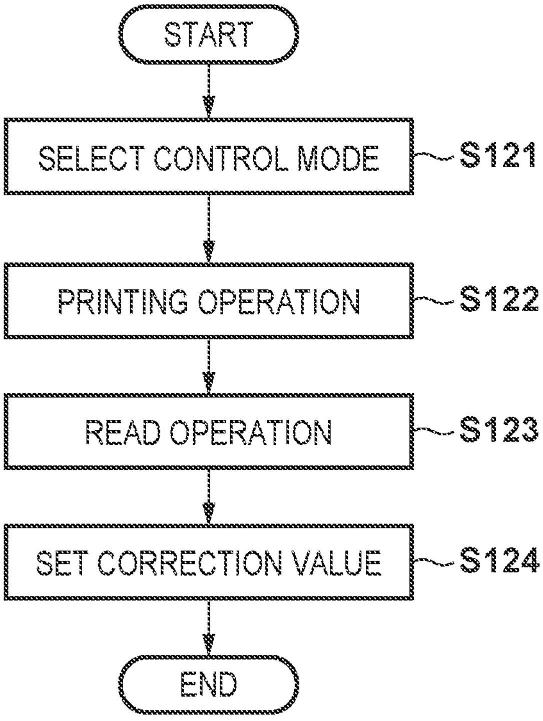
FIG. 17C is a flowchart showing an example of processing for setting a correction value.

In the registration correction processing as described above, if the vibration of the carriage 3 or the like is large, the reading accuracy of the pattern 400 by the reading sensor 16 may be decreased. As a result, an appropriate registration correction value cannot be set. To prevent this, processing is performed in which a correction value for registration adjustment is set while selecting, as the control mode of carriage motors 61R and 61L, the control mode with the smallest vibration. FIG. 17C is a flowchart showing an example of this, which is an example of processing performed by a printing control unit 25.

In step S121, one control mode is selected from a plurality of control modes of the carriage motors 61R and 61L. The control mode to be selected may be determined in advance. Alternatively, the velocity fluctuation amount in each control mode may be calculated by the method described in the seventh embodiment, and the control mode with the smallest velocity fluctuation amount may be selected. The plurality of control modes can include twin driving in which the carriage motors 61R and 61L are equal or different in the output ratio, single driving using the carriage motor 61R, and single driving using the carriage motor 61L.

In step S122, a printing operation is performed in which the registration adjustment pattern is printed on a print medium. In step S123, the reading sensor 16 reads the registration adjustment pattern printed in step S122. During the processing in each of steps S122 and S123, in the movement control of the carriage 3, the carriage 3 is moved by controlling the carriage motors 61R and 61L in the control mode selected in step S121.

In step S124, based on the result of the pattern read in step S123, a correction value is set. The set correction value is used in the subsequent printing operation.

By calculating the correction value as described above, it is possible to read the registration adjustment pattern in the operation method in which the influence of disturbance caused by the vibration of the carriage motors 61R and 61L is reduced. Therefore, it is possible to obtain a more suitable correction value.

Other Embodiments

In each of the above-described embodiments, a belt transmission mechanism is used as the driving unit 6, but another driving mechanism (for example, a ball screw mechanism or the like) capable of reciprocating the carriage 3 may be used. A clutch or the like may be used to connect and disconnect the driving force of each of two carriage motors in the driving mechanism. The carriage motors 61R and 61L are not limited to brushless motors, and motors of another kind may be used.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-082602, filed May 14, 2021, which is hereby incorporated by reference herein in its entirety.

What is claimed is:

1. A printing apparatus comprising:

a carriage mounted with a printing unit configured to perform printing on a print medium;

a first motor configured to rotate in a first direction to move the carriage in a predetermined direction;

a second motor configured to rotate in the first direction to move the carriage in the predetermined direction; and a control unit configured to control the first motor and the second motor, wherein the control unit executes:

a first mode in which, when causing the printing unit to perform printing under a first printing condition, the first motor is driven in the first direction and the second motor is driven in the first direction, and a second mode in which, when causing the printing unit to perform printing under a second printing condition different from the first printing condition, the first motor is driven in the first direction and the second motor is driven in the first direction while changing an output ratio between the first motor and the second motor.

2. The apparatus according to claim 1, wherein the second mode is a mode in which an output of one of the first motor and the second motor is controlled to be lower than an output of the other of the first motor and the second motor.

3. The apparatus according to claim 1, wherein the first mode is a mode in which an output of the first motor and an output of the second motor are controlled to be equal to each other.

4. The apparatus according to claim 1, wherein each of the first printing condition and the second printing condition is a condition related to the type of the print medium.

5. The apparatus according to claim 1, wherein each of the first printing condition and the second printing condition is a condition related to a moving velocity of the carriage upon printing.

6. The apparatus according to claim 1, further comprising:

a driving unit configured to move the carriage while using the first motor and the second motor as driving sources, wherein the driving unit includes:

a plurality of rotation members, and an endless belt wound around the plurality of rotation members and connected with the carriage, the first motor is the driving source configured to rotate a first rotation member included in the plurality of rotation members, and the second motor is the driving source configured to rotate a second rotation member included in the plurality of rotation members.

7. The apparatus according to claim 1, further comprising:

a measurement unit configured to measure a characteristic of each of the first motor and the second motor, wherein the measurement unit measures the characteristic related to an output of each of the first motor and the second motor.

8. The apparatus according to claim 1, further comprising:

a measurement unit configured to measure a characteristic of each of the first motor and the second motor, wherein the measurement unit:

measures, as the characteristic, a relationship between a velocity of the carriage moved by driving of the first motor and control information of the first motor, and measures, as the characteristic, a relationship between a velocity of the carriage moved by driving of the second motor and control information of the second motor.

9. The apparatus according to claim 8, wherein the measurement unit measures the characteristic when the printing apparatus is activated.

10. The apparatus according to claim 8, wherein when printing is performed under the second printing condition, the measurement unit measures the characteristic before the printing.

11. The apparatus according to claim 1, wherein when controlling in a third mode in which one of the first motor and the second motor is not driven, the control unit selects the motor to be driven in the third mode based on ratio information defining a use ratio between the first motor and the second motor.

12. The apparatus according to claim 11, wherein in the ratio information, the higher use ratio is set for the motor, of the first motor and the second motor, having high heat dissipation in an arrangement portion thereof.

13. The apparatus according to claim 1, further comprising:

a cooling unit configured to cool the first motor and the second motor.

14. The apparatus according to claim 1, wherein the control unit performs a movement test of the carriage by driving one of the first motor and the second motor.

15. The apparatus according to claim 14, wherein in the movement test, the carriage is moved in an entire range of a movement range thereof.

16. The apparatus according to claim 14, wherein in the movement test, the control unit increases stepwise an output of the motor driven in the movement test.

17. The apparatus according to claim 1, further comprising:

a measurement unit configured to measure a velocity fluctuation amount of the carriage during constant-velocity movement of the carriage, wherein the control unit controls the first motor and the second motor in a plurality of modes including the first mode and the second mode, and the measurement unit measures the velocity fluctuation amount in each mode.

18. The apparatus according to claim 17, wherein the measurement unit measures the velocity fluctuation amount based on detection results of a sensor that detects a position of the carriage.

19. The apparatus according to claim 1, further comprising:

a sensor provided in the carriage and configured to read a registration adjustment pattern printed on the print medium, wherein when reading the registration adjustment pattern by the sensor, the control unit moves the carriage by controlling the first motor and the second motor in a predetermined mode of a plurality of modes including the first mode and the second mode.

20. A carriage apparatus comprising:

a carriage mounted with a printing unit configured to perform printing on a print medium;

a first motor configured to rotate in a first direction to move the carriage in a predetermined direction;

a second motor configured to rotate in the first direction to move the carriage in the predetermined direction; and a control unit configured to control the first motor and the second motor, wherein the control unit executes:

a first mode in which, when causing the printing unit to perform printing under a first printing condition, the first motor is driven in the first direction and the second motor is driven in the first direction, and a second mode in which, when causing the printing unit to perform printing under a second printing condition different from the first printing condition, the first motor is driven in the first direction and the second motor is driven in the first direction while changing an output ratio between the first motor and the second motor.

* * * * *